(12) United States Patent
Tang et al.

(10) Patent No.: US 8,358,473 B2
(45) Date of Patent: Jan. 22, 2013

(54) OPTICAL LENS FOR IMAGE PICKUP

(75) Inventors: Hsiang-Chi Tang, Taichung (TW);
Ming-Ta Chou, Taichung (TW)

(73) Assignee: Largan Precision Co., Taichung City (TW)

( * ) Notice: Subject to any disclaimer, the term of this patent is extended or adjusted under 35 U.S.C. 154(b) by 0 days.

(21) Appl. No.: 13/251,707

(22) Filed: Oct. 3, 2011

(65) Prior Publication Data

US 2012/0287514 A1 Nov. 15, 2012

(30) Foreign Application Priority Data

May 12, 2011 (TW) .............................. 100116754 A

(51) Int. Cl.
*G02B 3/02* (2006.01)
*G02B 9/34* (2006.01)
(52) U.S. Cl. .......................... 359/715; 359/740; 359/774
(58) Field of Classification Search .................. 359/715, 359/740, 774; 396/439
See application file for complete search history.

(56) References Cited

U.S. PATENT DOCUMENTS

| | | | |
|---|---|---|---|
| 7,345,830 B2 | 3/2008 | Shinohara | |
| 7,355,801 B2 * | 4/2008 | Chen et al. ..................... | 359/773 |
| 7,375,903 B2 | 5/2008 | Taniyama | |
| 7,443,611 B2 | 10/2008 | Shinohara | |
| 7,535,659 B2 * | 5/2009 | Sano .............................. | 359/773 |
| 7,755,853 B2 | 7/2010 | Taniyama | |
| 7,785,023 B1 | 8/2010 | Xu | |
| 2008/0180813 A1 | 7/2008 | Taniyama | |
| 2009/0257133 A1 * | 10/2009 | Sano et al. .................... | 359/715 |
| 2011/0102912 A1 * | 5/2011 | Park ............................. | 359/715 |

FOREIGN PATENT DOCUMENTS

WO 2010026691 A1 3/2010

* cited by examiner

*Primary Examiner* — Evelyn A. Lester
(74) *Attorney, Agent, or Firm* — Wang Law Firm, Inc.; Li K. Wang; Stephen Hsu

(57) ABSTRACT

An optical lens for image pickup, sequentially arranged from an object side to an image side, comprising: the first lens element with positive refractive power having a convex object-side surface, the second lens element with negative refractive power having a convex object-side surface and a concave image-side surface, the plastic third lens element with positive refractive power having a concave object-side surface and a convex image-side surface with both being aspheric, the plastic fourth lens element with positive refractive power having a convex object-side surface and a concave image-side surface with both being aspheric. By such arrangements, the optical lens for image pickup satisfies conditions related to reduce the sensitivity and to shorten the total length for use in compact cameras and mobile phones with camera functionalities.

21 Claims, 16 Drawing Sheets

OPTICAL LENS FOR IMAGE PICKUP

BACKGROUND OF THE INVENTION

1. Field of the Invention

The present invention relates to an optical lens for image pickup, and more particularly to the optical lens for image pickup with a short total length and a low cost, and comprised of four lens elements and applied to electronic products.

2. Description of the Related Art

In compact electronic products such as digital still cameras and mobile phone cameras, an optical lens for image pickup is installed for capturing images of an object, and the optical lens for image pickup tends to be developed with a compact design and a low cost, while meeting the user requirements for high resolution and high image quality.

In general, a conventional optical lens for image pickup of a compact electronic product comes with different designs, including the two-lens, three-lens, four-lens, and five-or-more lens designs. If the image quality of a compact electronic product is taken into consideration, the optical lens for image pickup with a design of four lens elements or five lens elements has advantages on image aberration and modulation transfer function (MTF) performance, wherein the design with four lens element having less lenses than the design with five lens elements and a lower manufacturing cost is suitable for electronic products having the high quality and high pixel requirements.

In various optical lenses for image pickup with the four-lens design, the prior art adopts different combinations of positive and negative refractive powers, wherein the first lens element has positive refractive power, the second lens element has negative refractive power, the third lens element has positive refractive power, and the fourth lens element has negative refractive power as disclosed in WIPO Pat. No. WO2010026691 and U.S. publication and U.S. Pat. No. 7,785,023, 2008/180813, and U.S. Pat. No. 7,755,853 to provide a better aberration correction.

In products such as compact digital cameras, web cameras, and mobile phone cameras, the optical lens for image pickup requires a compact design, a short focal length, and a good aberration correction. In a design with the combination of the first lens element with positive refractive power, the second lens element with negative refractive power, the third lens element with positive refractive power, and the fourth lens element with positive refractive power, a compact requirement can be achieved most probably as disclosed in U.S. Pat. Nos. 7,443,611, 7,375,903 and 7,345,830. However, the optical lens for image pickup disclosed in these patents comprises the third lens element having a convex object side in proximity to the optical axis and turning into a concave shape at the edge of the lens, so that the curvature has a drastic change and a complicated shape, and it is relatively difficult to manufacture the lenses of this sort, which is unfavorable for production. In addition, the installation of the meniscus third lens element can correct the astigmatic field curving, and the meniscus third lens element has a shorter effective diameter and a greater curvature of the image-side surface to provide better positive refractive power and suppress the light effectively, so that there is a better flexibility for the installation space of the lenses. The difficulty of the cooling and deformation controls during the production of thicker second lens element and the longer total length of the lens can be overcome. Therefore, the present invention provides a practical design for shortening the optical lens for image pickup, while using four lenses with different refractive powers, and a combination of convex and concave optical surfaces, not only reducing the total length of the optical lens for image pickup, but also improving the image quality, reducing the manufacturing cost by using simple lenses, and applying the lenses for electronic products.

SUMMARY OF THE INVENTION

Therefore, it is a primary objective of the present invention to provide an optical lens for image pickup, sequentially arranged from an object side to an image side, comprising: the first lens element, the second lens element, the third lens element, and the fourth lens element, wherein the first lens element with positive refractive power has a convex object-side surface; the second lens element with negative refractive power has a convex object-side surface and a concave image-side surface; the plastic third lens element with positive refractive power has a concave object-side surface and a convex image-side surface, and both object-side surface and image-side surface thereof being aspheric; and the plastic fourth lens element with positive refractive power has a convex object-side surface and a concave image-side surface, and both object-side surface and image-side surface being aspheric. The optical lens for image pickup satisfies the following relations:

$$0.20 < (R_3 - R_4)/(R_3 + R_4) < 0.70; \qquad (1)$$

$$|(R_5 - R_6)/(R_5 + R_6)| < 0.21; \qquad (2)$$

$$0.1 < R_4/f < 0.5. \qquad (3)$$

Wherein, $R_3$ is a curvature radius of the object-side surface of the second lens element, $R_4$ is a curvature radius of the image-side surface of the second lens element, $R_5$ is a curvature radius of the object-side surface of the third lens element, $R_6$ is a curvature radius of the image-side surface of the third lens element, and f is a focal length of the optical lens for image pickup.

On the other hand, the present invention provides an optical lens for image pickup as described above, wherein at least one of the object-side surface and the image-side surface of the fourth lens element has at least one inflection point, and the following relations are satisfied in addition to the relations (1), (2) and (3):

$$|(R_7 - R_8)/(R_7 + R_8)| < 0.18; \qquad (4)$$

$$28 < v_1 - v_2 < 42; \qquad (5)$$

$$0.3 < (R_3 - R_4)/(R_3 + R_4) < 0.52; \qquad (6)$$

$$0 < f/f_3 < 0.40; \qquad (7)$$

$$0 < |f_2|/f_3 < 0.5; \qquad (8)$$

$$0 < T_{12}/T_{23} < 0.4; \qquad (9)$$

$$0.2 < R_1/f < 0.5. \qquad (10)$$

Wherein, $R_1$ is a curvature radius of the object-side surface of the first lens element, $R_3$ is the curvature radius of the object-side surface of the second lens element, $R_4$ is the curvature radius of the image-side surface of the second lens element, $R_7$ is a curvature radius of the object-side surface of the fourth lens element, $R_8$ is a curvature radius of the image-side surface of the fourth lens element, f is the focal length of the optical lens for image pickup, $f_2$ is a focal length of the second lens element, $f_3$ is a focal length of the third lens element, $T_{12}$ is an axial distance between the first lens element and the second lens element, $T_{23}$ is an axial distance between the second lens element and the third lens element, $v_1$ is an Abbe number of the first lens element, and $v_2$ is an Abbe number of the second lens element.

On the other hand, the present invention provides an optical lens for image pickup, as described above, further comprises an image sensor at an image plane, wherein the first lens element has a concave image-side surface, and at least one of the object-side surface and image-side surface of the fourth lens element has at least one inflection point, and one or more of the following relation are satisfied, in addition to the relations (1), (2), (3) and (4):

$$0.5 < T_{23}/T_{34} < 1.5; \qquad (11)$$

$$0.2 < (CT_2/f)*10 < 0.8; \qquad (12)$$

$$TTL/ImgH < 2.1. \qquad (13)$$

Wherein, $T_{23}$ is the axial distance between the second lens element and the third lens element, $T_{34}$ is an axial distance between the third lens element and the fourth lens element, f is the focal length of the optical lens for image pickup, $CT_2$ is a central thickness of the second lens element, TTL is an axial distance between the object-side surface of the first lens element and the image plane, and ImgH is half of the diagonal length of an effective photosensitive area of the image sensor.

Another objective of the present invention provides an optical lens for image pickup, sequentially arranged from an object side to an image side, comprising: the first lens element, the second lens element, the third lens element, and the fourth lens element; wherein the first lens element with positive refractive power has a convex object-side surface; the second lens element with negative refractive power has a convex object-side surface and concave image-side surface; the third lens element with positive refractive power is made of plastic and has a concave object-side surface and a convex image-side surface, and both object-side surface and image-side surface being aspheric; the fourth lens element with positive refractive power is made of plastic and has a convex object-side surface and a concave image-side surface, and both object-side surface and image-side surface being aspheric; and the optical lens for image pickup satisfies the following relations:

$$0.20 < (R_3-R_4)/(R_3+R_4) < 0.70; \qquad (1)$$

$$|(R_2-R_8)/(R_2+R_8)| < 0.18; \qquad (4)$$

$$0.1 < R_4/f < 0.5; \qquad (3)$$

$$0 < f/f_3 < 0.40. \qquad (7)$$

Wherein, $R_3$ is a curvature radius of the object-side surface of the second lens element, $R_4$ is a curvature radius of the image-side surface of the second lens element, $R_7$ is a curvature radius of the object-side surface of the fourth lens element, $R_8$ is a curvature radius of the image-side surface of the fourth lens element, f is a focal length of the optical lens for image pickup, and $f_3$ is a focal length of the third lens element.

On the other hand, the present invention provides an optical lens for image pickup as described above, wherein at least one of the object-side surface and the image-side surface of the fourth lens element has at least one inflection point, and the optical lens for image pickup satisfies one or more of the following relations in addition to the relations (1), (4), (3) and (7):

$$0 < |f_2|/f_3 < 0.5; \qquad (8)$$

$$28 < v_1-v_2 < 40; \qquad (14)$$

$$0.5 < T_{23}/T_{34} < 1.5; \qquad (11)$$

$$|(R_5-R_6)/(R_5+R_6)| < 0.21; \qquad (2)$$

$$0.3 < (R_3-R_4)/(R_3+R_4) < 0.52; \qquad (6)$$

$$0.2 < (CT_2/f)*10 < 0.8. \qquad (12)$$

Wherein f is the focal length of the optical lens for image pickup, $f_2$ is a focal length of the second lens element, $f_3$ is the focal length of the third lens element, $v_1$ is an Abbe number of the first lens element, $v_2$ is an Abbe number of the second lens element, $T_{23}$ is an axial distance between the second lens element and the third lens element, $T_{34}$ is an axial distance between the third lens element and the fourth lens element, $R_3$ is the curvature radius of the object-side surface of the second lens element, $R_4$ is the curvature radius of the image-side surface of the second lens element, $R_5$ is a curvature radius of the object-side surface of the third lens element, $R_6$ is a curvature radius of the image-side surface of the third lens element, and $CT_2$ is a central thickness of the second lens element near the optical axis.

With the installation of the aforementioned first lens element, second lens element, third lens element and fourth lens element with an appropriate interval apart from one another, the present invention can shorten the total length of the optical lens for image pickup effectively, while providing a good aberration correction and an advantageous modulation transfer function (MTF).

In the optical lens for image pickup of the present invention, the first lens element with positive refractive power provides most of the refractive power required by the system that facilitates the reduction of the total length, and the second lens element with negative refractive power can correct aberrations produced by the lens element with positive refractive power effectively and correct the Petzval sum of the system to make the image surface on the edge flatter, and the third lens element and the fourth lens with positive refractive power element can provide the positive refractive power required by the system to reduce the reduce the system's sensitivity to errors to facilitate the manufacture. In addition, the fourth lens element with positive refractive power can suppress the angle of the light incident into a light sensor, so that the incident angle will not be too large, which helps improving the efficiency of receiving images by the image sensor.

In the optical lens for image pickup of the present invention, the stop is a front stop installed between an object to be photographed and the first lens element, or a middle stop installed between the first lens element and the second lens element in order to provide a longer distance between an exit pupil of the optical lens for image pickup and the image plane, so that the light of an image can be projected directly and then received by the image sensor to avoid dark corners or achieve the telecentric effect on the image side. In general, the telecentric effect can improve the brightness of the image plane and enhance the speed of receiving images by the CCD or CMOS image sensor.

If the fourth lens element has an inflection point, the inflection point is used for guiding light of an image with an angle out from the edges of the third lens element, such that the light of an image at the off-axis view angle is guided to the image sensor and received by the image sensor. In addition the meniscus third lens element has a concave object-side surface and a convex image-side surface for correcting the astigmatic field curving effectively. In addition, the third lens element and fourth lens element are made of plastic, facilitating the manufacture and lowering the cost.

DETAILED DESCRIPTION OF THE PREFERRED EMBODIMENTS

Figure 1A:
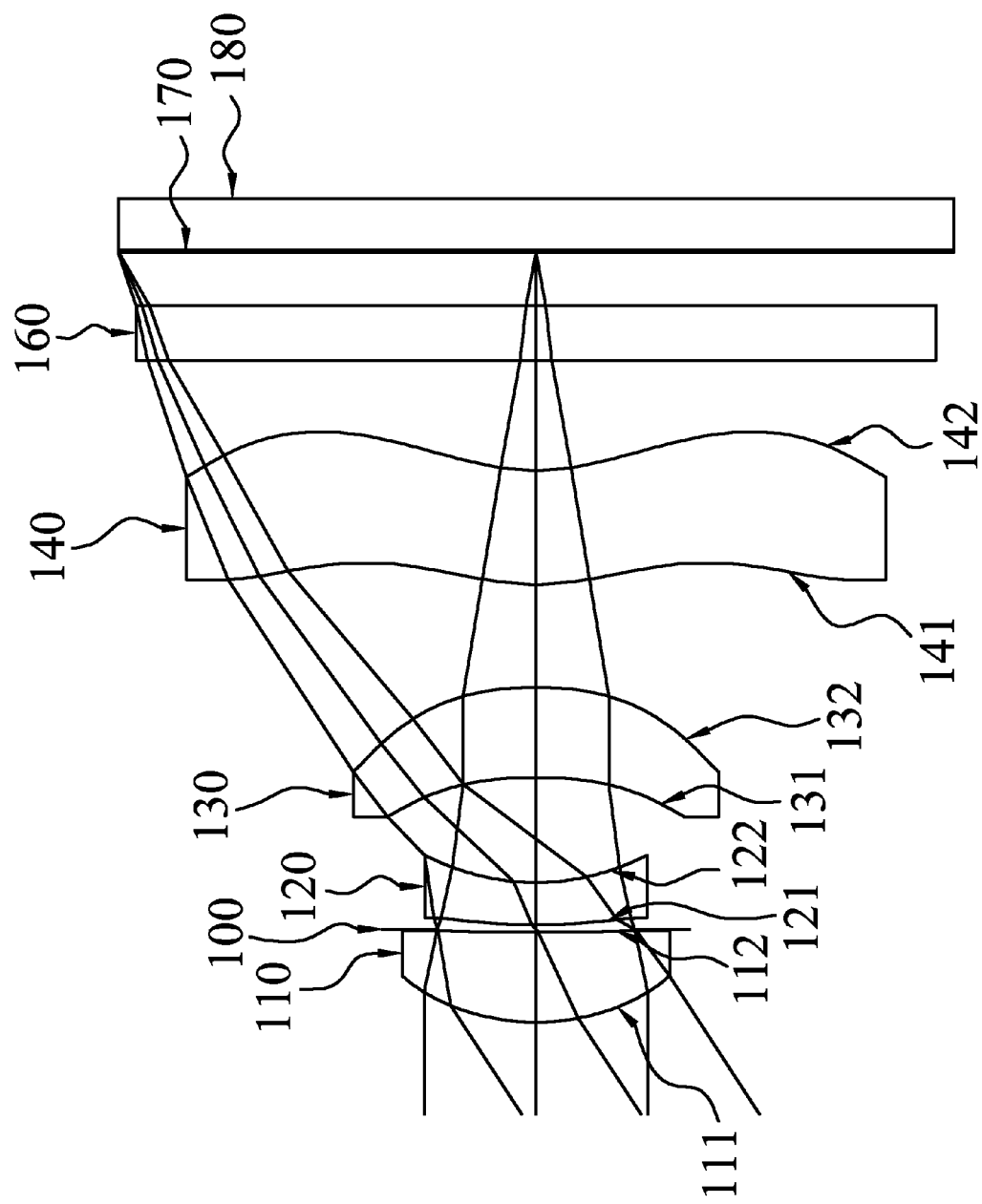
FIG. 1A is a schematic view of an optical lens in accordance with the first preferred embodiment of the present invention.

With reference to FIG. 1A for an optical lens for image pickup of the present invention, the optical lens for image pickup, sequentially arranged from an object side to an image side along an optical axis, comprises: the first lens element 110, the second lens element 120, the third lens element 130 and the fourth lens element 140, wherein the first lens element 110 with positive refractive power has a convex object-side surface 111; the second lens element 120 with negative refractive power has a convex object-side surface 121 and a concave image-side surface 122; the plastic third lens element 130 with positive refractive power has a concave object-side surface 131 and a convex image-side surface 132, and both object-side surface 131 and image-side surface 132 are aspheric; and the plastic fourth lens element 140 with positive refractive power has a convex object-side surface 141 and a concave image-side surface 142, and both object-side surface 141 and image-side surface 142 thereof are aspheric; and the optical lens for image pickup further comprises a stop, which can be an aperture stop 100 and an IR-filter 160, wherein the aperture stop 100 is a middle aperture stop installed between the first lens element 110 and the second lens element 120; the IR-filter 160 is installed between the fourth lens element 140 and the image plane 170 and generally made of panel glass without affecting the focal length f of the optical lens for image pickup of the present invention. The optical lens for image pickup further comprises an image sensor 180 at an image plane 170 for imaging an object to be photographed.

The first lens element 110, second lens element 120, third lens element 130 and fourth lens element 140 have aspherical surfaces, and comply with the aspherical surface formula as given in Equation (15).

$$X(Y) = \frac{(Y^2/R)}{1+\sqrt{(1-(1+K)(Y/R)^2)}} + \sum_i (A_i)\cdot(Y^i) \quad (15)$$

Wherein, X is the relative height from a point on the spherical surface with a distance Y between the optical axis and a tangent plane at the tip of the optical axis of the spherical surface;

Y is the distance between a point on the curve of the spherical surface and the optical axis;

R is the curvature radius;

K is the conic coefficient; and $A_i$ is the $i^{tch}$ level aspherical surface coefficient.

In the optical lens for image pickup of the present invention, the first lens element 110, second lens element 120, third lens element 130 and fourth lens element 140 can be spherical or aspherical surfaces, and if aspherical optical surfaces are adopted, then curvature radius of the optical surface can be used for changing the refractive power to reduce or eliminate aberrations, so as to decrease the number of lens elements used in the optical lens for image pickup, and shorten the total length of the optical lens for image pickup effectively. With the installation of the first lens element 110, second lens element 120, third lens element 130 and fourth lens element 140, the optical lens for image pickup of the present invention satisfies the relations (1), (2) and (3).

In the optical lens for image pickup of the present invention, the second lens element 120 provides the main negative refractive power, and if the relation (3) is satisfied, the image-side surface 122 has a more appropriate curvature radius for improving the aberration correction ability. If the relation (1) is satisfied, the curvature of the object-side surface 121 and the image-side surface 122 of the second lens element 120 can limit the change of the shape of the second lens element 120 to facilitate the manufacture and lower the cost. Similarly, if the curvature of the third lens element 130 satisfies the relation (2), the change of the shape of the third lens element 130 can be limited to a condition of being not too large to facilitate the manufacture and lower the cost. If the curvature of the fourth lens element 140 satisfies the relation (4), the shape can be controlled to adjust the refractive power of the fourth lens element 140 appropriately to reduce the system's sensitivity to errors and facilitate the manufacture and lower the cost.

In the optical lens for image pickup of the present invention, if the relations (7) and (8) are satisfied, wherein f is the focal length of the optical lens for image pickup, $f_2$ is the focal length of the second lens element 120, $f_3$ is the focal length of the third lens element 130, and appropriate refractive powers are allocated in the optical lens for image pickup, the refractive powers required by the second lens element 120 and the third lens element 130 can correct the system aberration and reduce the system's sensitivity to errors.

If the relations (9) and (11) are satisfied, the distance between the first lens element 110 and the fourth lens element 140 can be limited to set the optical lens for image pickup to an appropriate length. Similarly, if the relation (12) is satisfied, the focal length of the optical lens for image pickup per unit length can adjust the central thickness $CT_2$ of the second lens element 120 to reduce the total length of the optical lens for image pickup and provide an appropriate thickness of the second lens element 120, so as to improve the yield rate of the lenses. If the relation (13) is satisfied, the total length of the optical lens for image pickup can be reduced effectively, such that a larger effective pixel range of the image sensor 180 can be achieved in the same total length to facilitate adjusting the total length of the system appropriately.

If the relations (5) and (14) are satisfied, the difference between the Abbe number $v_1$ of the first lens element 110 and the Abbe number $v_2$ of the second lens element 120 falls within an appropriate range to correct the chromic aberration produced by the first lens element 110 and the second lens element 120 and improve the chromic aberration correction ability of the second lens element 120. If the relation (10) is satisfied, the shape of the object-side surface 111 of the first lens element 110 can provide appropriate positive refractive power to the system, and achieve a good result of reducing the total length of the system.

The optical lens for image pickup of the present invention is described by means of preferred embodiments with relevant drawings as follows.

First Preferred Embodiment

Figure 1B:
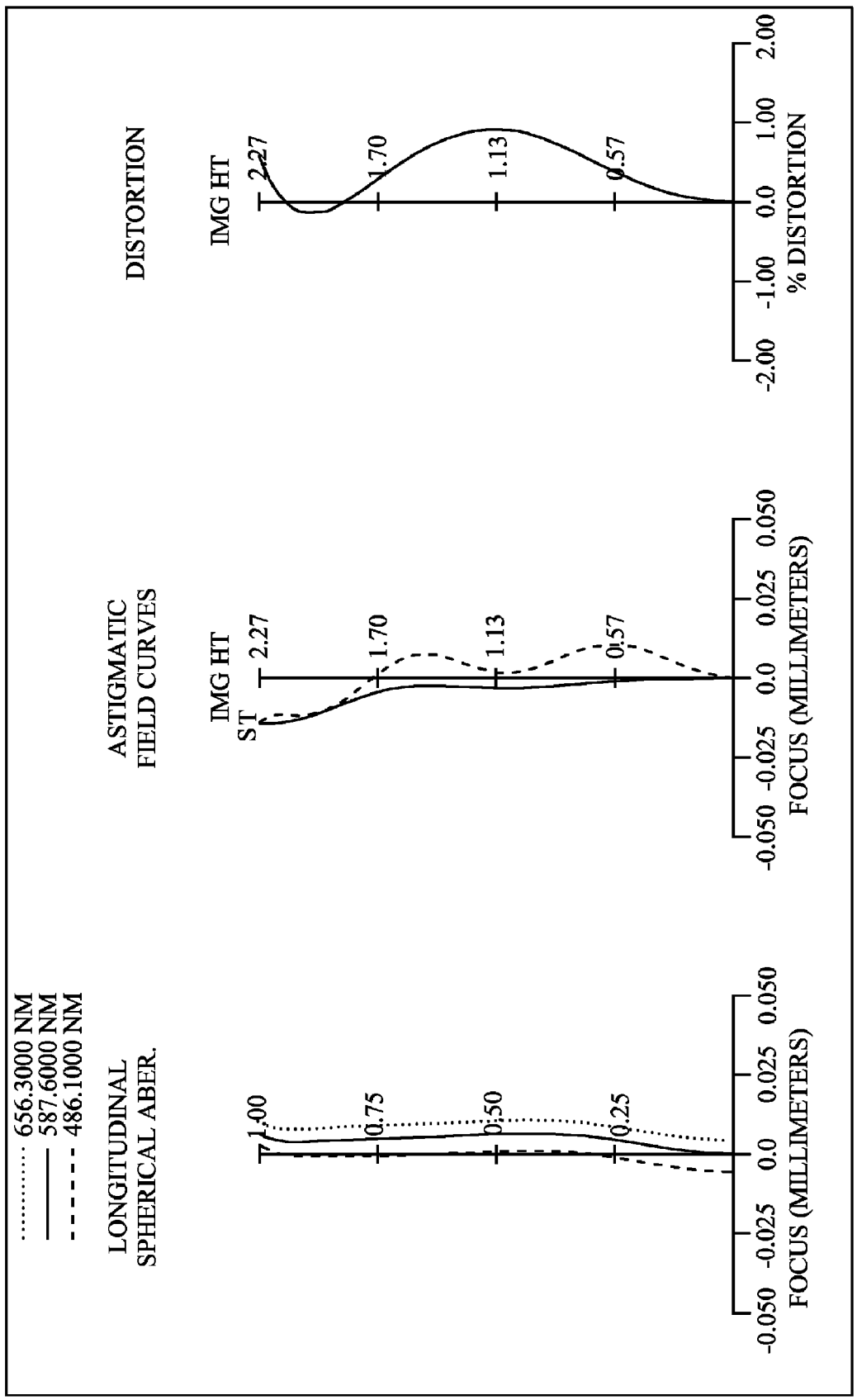
FIG. 1B is a schematic view of a series of aberration curves of the first preferred embodiment of the present invention.

With reference to FIGS. 1A and 1B for a schematic view and a series of aberration curves of an optical lens for image pickup in accordance with the first preferred embodiment of the present invention respectively, the optical lens for image pickup of this preferred embodiment comprises four lens elements, a stop and an IR-filter 160. More specifically, the stop can be an aperture stop 100, and the optical lens for image pickup, sequentially arranged from an object side to an image side along an optical axis, comprises: a plastic first lens element 110 with positive refractive power, having a convex object-side surface 111 and a concave image-side surface 112, and both object-side surface 111 and image-side surface 112 thereof being aspheric; an aperture stop 100; a plastic second lens element 120 with negative refractive power, having a convex object-side surface 121 and a concave image-side surface 122, and both object-side surface 121 and image-side surface 122 thereof being aspheric; a plastic third lens element 130 with positive refractive power, having a concave object-side surface 131 and a convex image-side surface 132, and both object-side surface 131 and image-side surface 132 thereof being aspheric; a plastic fourth lens element 140 with positive refractive power, having a convex object-side surface 141 and a concave image-side surface 142, and both object-side surface 141 and image-side surface 142 thereof being aspheric, and at least one of the object-side surface 141 and the image-side surface 142 having at least one inflection point; a glass IR-filter 160, being made of a panel glass for adjusting a wavelength section of the light of an image; and an image sensor 180 at an image plane 170. With the combination of the four lens elements, the aperture stop 100 and the IR-filter 160, an image of the object to be photographed can be formed at the image sensor 180.

TABLE 1

Optical data of this preferred embodiment
f = 3.46 mm, Fno = 2.85, HFOV = 33.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.264190 (ASP) | 0.491 | Plastic | 1.544 | 55.9 | 2.34 |
| 2 | | 120.243100 (ASP) | 0.014 | | | | |
| 3 | Ape. Stop | Plano | 0.025 | | | | |
| 4 | Lens 2 | 2.960060 (ASP) | 0.230 | Plastic | 1.634 | 23.8 | −3.45 |
| 5 | t | 1.220770 (ASP) | 0.573 | | | | |
| 6 | Lens 3 | −2.250110 (ASP) | 0.490 | Plastic | 1.544 | 55.9 | 13.17 |
| 7 | | −1.843720 (ASP) | 0.561 | | | | |
| 8 | Lens 4 | 1.395250 (ASP) | 0.620 | Plastic | 1.535 | 56.3 | 101.56 |
| 9 | | 1.210370 (ASP) | 0.600 | | | | |
| 10 | IR filter | Plano | 0.300 | Glass | 1.516 | 64.1 | — |
| 11 | | Plano | 0.286 | | | | |
| 12 | Image | Plano | — | | | | |

Note:
Reference wavelength is 587.6 nm.
ASP stands for aspherical surfaces.

The optical data of this preferred embodiment are listed in Table 1, wherein the object-side surface and the image-side surface of the first lens element 110 to the fourth lens element 140 comply with the aspherical surface formula as given in Equation (15), and their aspheric coefficients are listed in Table 2 as follows:

TABLE 2

Aspheric coefficients of this preferred embodiment

| | Surface # | | | | | | | |
|---|---|---|---|---|---|---|---|---|
| | 1 | 2 | 4 | 5 | 6 | 7 | 8 | 9 |
| k = | 7.82987E−02 | −9.00000E+01 | −5.41536E+01 | 1.26500E+00 | −2.91680E+00 | −8.67362E−17 | −5.05901E+00 | −3.86689E+00 |
| A4 = | 2.61065E−02 | 6.78884E−02 | 9.31128E−02 | −2.59320E−01 | −2.54378E−01 | −3.43460E−01 | −2.29723E−01 | −1.53736E−01 |
| A6 = | 5.82074E−02 | 1.30933E−01 | −3.06327E−01 | 2.47180E−01 | 1.33068E−01 | 3.81332E−01 | 1.04423E−01 | 6.81514E−02 |
| A8 = | −3.10968E−02 | −3.17567E−01 | 4.50480E−01 | −5.43126E−01 | −2.90132E−01 | −4.31906E−01 | −2.14275E−02 | −2.56022E−02 |
| A10 = | 1.56738E−01 | 1.29058E−01 | −9.63772E−01 | 2.06125E−01 | 2.47359E−01 | 2.20149E−01 | 4.59681E−04 | 6.33113E−03 |
| A12 = | | | | −3.20713E−01 | 2.32524E−01 | | 7.07566E−04 | −9.76275E−04 |
| A14 = | | | | | | | −9.32850E−05 | 7.64832E−05 |

With reference to Table 1 and FIG. 1B for the optical lens for image pickup of this preferred embodiment, the focal length of the optical lens for image pickup is f=3.46 (mm), the overall aperture stop value (f-number) of the optical lens for image pickup is Fno=2.85, the half of maximum view angle is HFOV=33.1°. After the optical data of this preferred embodiment are calculated and derived, the optical lens satisfies related conditions as shown in Table 3 below, and the related symbols have been described above and thus will not be described again.

TABLE 3

Data of related relations of this preferred embodiment

| Relation | Data | Relation | Data |
|---|---|---|---|
| $v_1 - v_2$ | 32.1 | $(R_3 - R_4)/(R_3 + R_4)$ | 0.42 |
| $(CT_2/f) * 10$ | 0.66 | $|(R_5 - R_6)/(R_5 + R_6)|$ | 0.10 |
| $T_{12}/T_{23}$ | 0.07 | $|(R_7 - R_8)/(R_7 + R_8)|$ | 0.07 |
| $T_{23}/T_{34}$ | 1.02 | $f/f_3$ | 0.26 |
| $R_1/f$ | 0.37 | $|f_2|/f_3$ | 0.26 |
| $R_4/f$ | 0.35 | TTL/ImgH | 1.80 |

According to the optical data as shown in Table 1 and the aberration curves as shown in FIG. 1B, the optical lens for image pickup in accordance with this preferred embodiment of the present invention provides good correction results in aspects of the longitudinal spherical aberration, astigmatic field curving, and distortion.

Second Preferred Embodiment

Figure 2A:
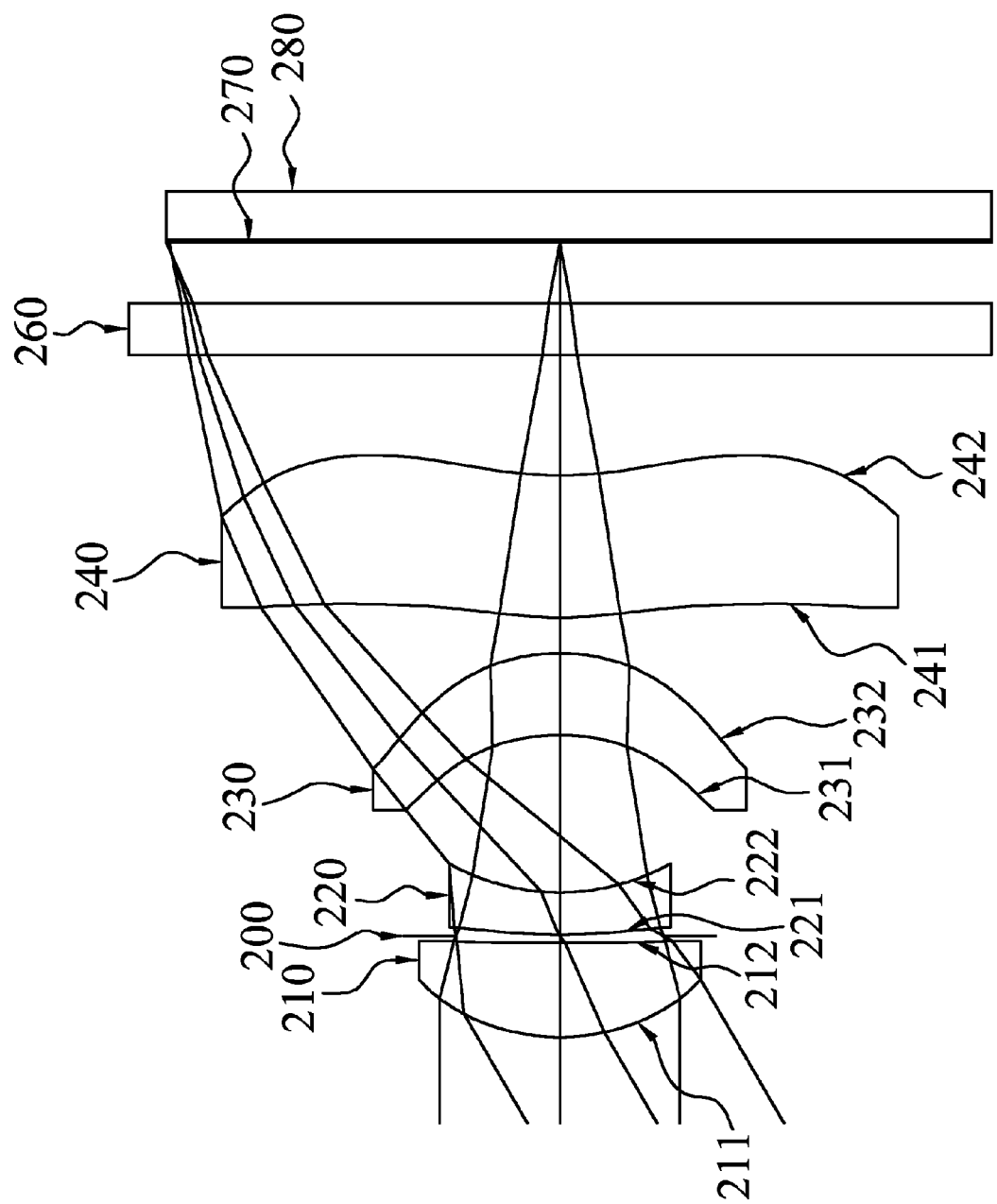
FIG. 2A is a schematic view of an optical lens in accordance with the second preferred embodiment of the present invention.
Figure 2B:
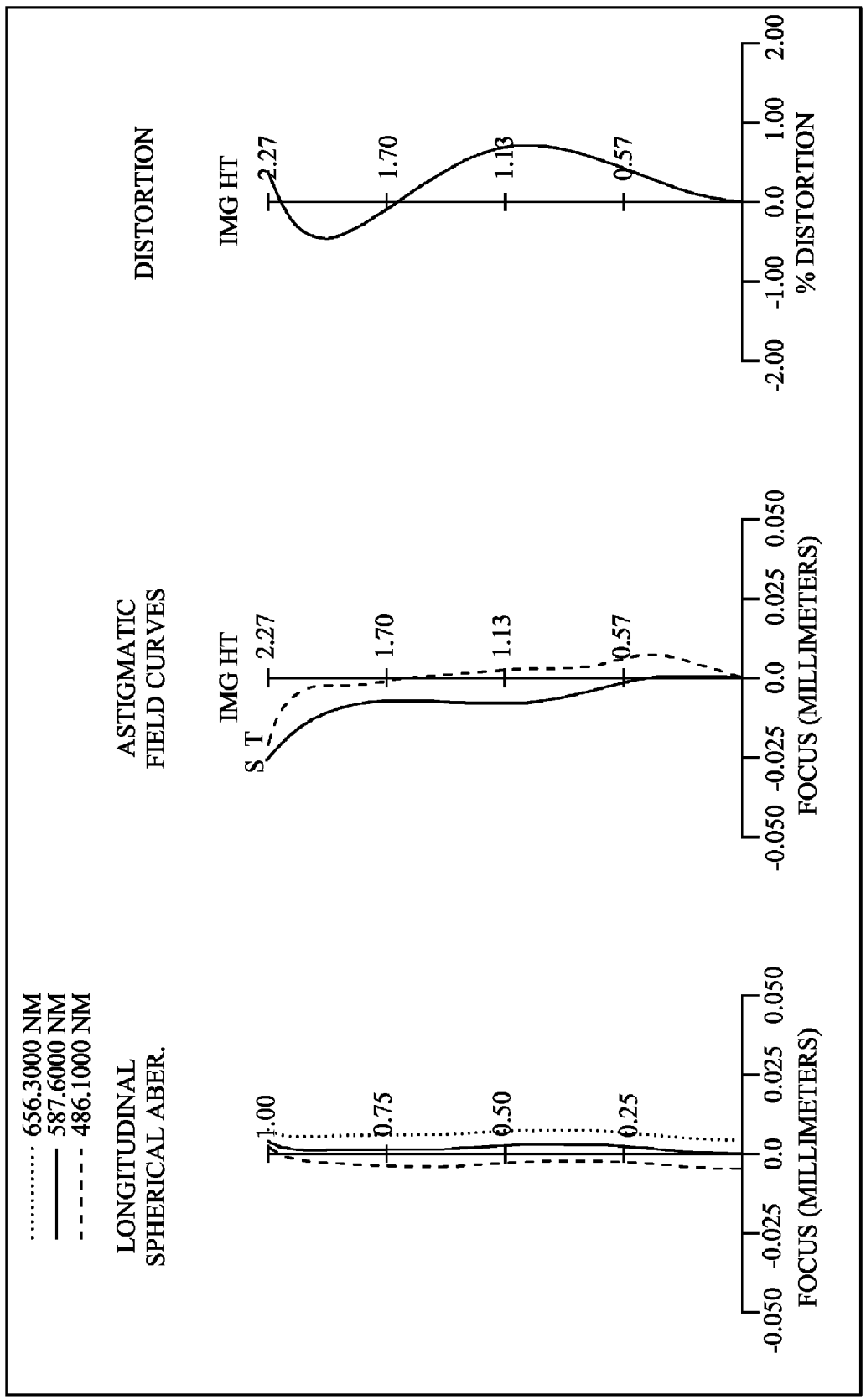
FIG. 2B is a schematic view of a series of aberration curves of the second preferred embodiment of the present invention.

With reference to FIGS. 2A and 2B for a schematic view and a series of aberration curves of an optical lens for image pickup in accordance with the second preferred embodiment of the present invention respectively, the optical lens for image pickup of this preferred embodiment comprises four lens elements, an aperture stop 200 and an IR-filter 260. More specifically, the optical lens for image pickup, sequentially arranged from an object side to an image side along an optical axis, comprises: a plastic first lens element 210 with positive refractive power, having a convex object-side surface 211 and a convex image-side surface 212, and both object-side surface 211 and image-side surface 212 thereof being aspheric; an aperture stop 200; a plastic second lens element 220 with negative refractive power, having a convex object-side surface 221 and a concave image-side surface 222, and both object-side surface 221 and image-side surface 222 thereof being aspheric; a plastic third lens element 230 with positive refractive power, having a concave object-side surface 231 and a convex image-side surface 232, and both object-side surface 231 and image-side surface 232 thereof being aspheric; a plastic fourth lens element 240 with positive refractive power, having a convex object-side surface 241 and a concave image-side surface 242, and both object-side surface 241 and image-side surface 242 thereof being aspheric, and at least one of the object-side surface 241 and the image-side surface 242 having at least one inflection point; a glass IR-filter 260, being made of a panel glass for adjusting a wavelength section of the light of an image; and an image sensor 280 at an image plane 270. With the combination of the four lens elements, the aperture stop 200 and the IR-filter 260, an image of the object to be photographed can be formed at the image sensor 280.

TABLE 4

Optical data of this preferred embodiment
f = 3.90 mm, Fno = 2.80, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.252630 (ASP) | 0.545 | Plastic | 1.544 | 55.9 | 2.30 |
| 2 | | −802.438600 (ASP) | 0.040 | | | | |
| 3 | Ape. Stop | Plano | 0.009 | | | | |
| 4 | Lens 2 | 3.581200 (ASP) | 0.244 | Plastic | 1.634 | 23.8 | −3.32 |
| 5 | | 1.291490 (ASP) | 0.912 | | | | |
| 6 | Lens 3 | −1.178490 (ASP) | 0.474 | Plastic | 1.544 | 55.9 | 16.10 |
| 7 | | −1.185980 (ASP) | 0.208 | | | | |
| 8 | Lens 4 | 2.262390 (ASP) | 0.822 | Plastic | 1.535 | 56.3 | 113.05 |
| 9 | | 2.052880 (ASP) | 0.700 | | | | |
| 10 | IR-filter | Plano | 0.300 | Glass | 1.516 | 64.1 | — |
| 11 | | Plano | 0.353 | | | | |
| 12 | Image | Plano | — | | | | |

Note:
Reference wavelength is 587.6 nm.
ASP stands for aspherical surfaces.

The optical data of this preferred embodiment are listed in Table 4, wherein the object-side surface and the image-side surface of the first lens element 210 to the fourth lens element 240 comply with the aspherical surface formula as given in Equation (15), and their aspheric coefficients are listed in Table 5 as follows:

TABLE 5

Aspheric coefficients of this preferred embodiment

| | Surface # | | | |
|---|---|---|---|---|
| | 1 | 2 | 4 | 5 |
| k = | 1.12630E−01 | −9.00000E+01 | −4.74807E+01 | 1.35881E+00 |
| A4 = | 1.40822E−02 | 1.15980E−01 | 8.98965E−02 | −1.52792E−01 |
| A6 = | 4.63013E−02 | −1.90874E−01 | −3.59422E−01 | 4.45040E−02 |
| A8 = | −5.44994E−02 | 4.08106E−01 | 6.43161E−01 | −1.18160E−01 |
| A10 = | 1.24001E−01 | −4.23253E−01 | −8.33351E−01 | 1.02575E−01 |
| A12 = | | | | −3.12074E−01 |

| | Surface # | | | |
|---|---|---|---|---|
| | 6 | 7 | 8 | 9 |
| k = | −4.99634E+00 | −2.00000E−02 | −2.12128E+01 | −1.38235E+00 |
| A4 = | −4.18192E−01 | −2.05978E−01 | −1.19587E−01 | −1.71564E−01 |
| A6 = | 8.24730E−02 | 2.81896E−01 | 7.94066E−02 | 6.79844E−02 |
| A8 = | −1.43683E−01 | −3.08773E−01 | −2.30659E−02 | −2.39703E−02 |
| A10 = | 1.85547E−01 | 1.94282E−01 | 9.42736E−04 | 6.05816E−03 |
| A12 = | 1.19482E−01 | | 7.87833E−04 | −1.00568E−03 |
| A14 = | | | −1.07245E−04 | 7.74255E−05 |

With reference to Table 4 and FIG. 2B for the optical lens for image pickup of this preferred embodiment, the focal length of the optical lens for image pickup is f=3.90 (mm), the overall aperture stop value (f-number) of the optical lens for image pickup is Fno=2.80, the half of maximum view angle is HFOV=30.1°. After the optical data of this preferred embodiment are calculated and derived, the optical lens satisfies related conditions as shown in Table 6 below, and the related symbols have been described above and thus will not be described again.

TABLE 6

Data of related relations of this preferred embodiment

| Relation | Data | Relation | Data |
|---|---|---|---|
| $v_1 - v_2$ | 32.1 | $(R_3 - R_4)/(R_3 + R_4)$ | 0.47 |
| $(CT_2/f) * 10$ | 0.63 | $|(R_5 - R_6)/(R_5 + R_6)|$ | 0.00 |
| $T_{12}/T_{23}$ | 0.05 | $|(R_7 - R_8)/(R_7 + R_8)|$ | 0.05 |
| $T_{23}/T_{34}$ | 4.38 | $f/f_3$ | 0.24 |
| $R_1/f$ | 0.32 | $|f_2|/f_3$ | 0.21 |
| $R_4/f$ | 0.33 | TTL/ImgH | 1.99 |

According to the optical data as shown in Table 4 and the aberration curves as shown in FIG. 2B, the optical lens for image pickup in accordance with this preferred embodiment of the present invention provides good correction results in aspects of the longitudinal spherical aberration, astigmatic field curving, and distortion.

Third Preferred Embodiment

Figure 3A:
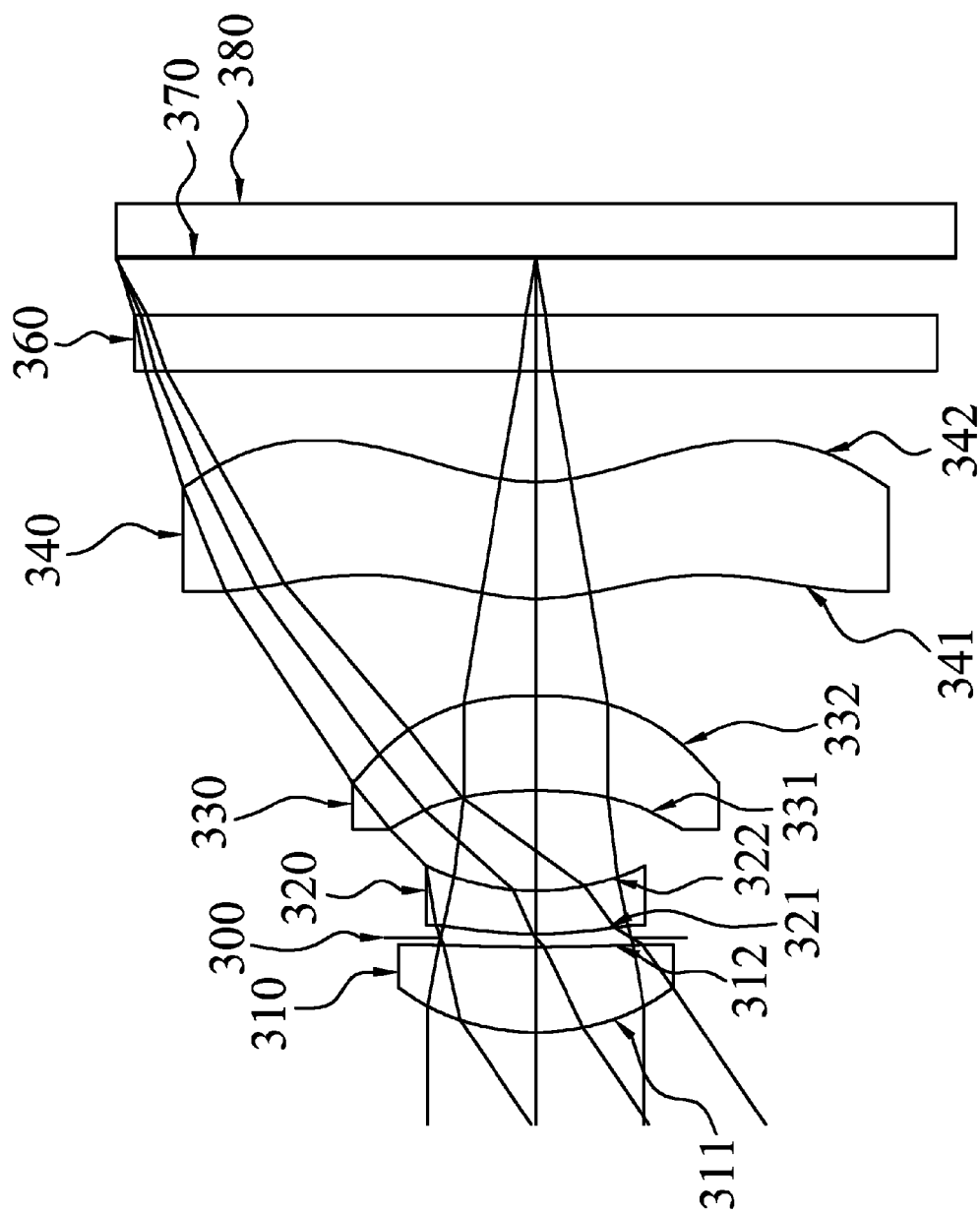
FIG. 3A is a schematic view of an optical lens in accordance with the third preferred embodiment of the present invention.
Figure 3B:
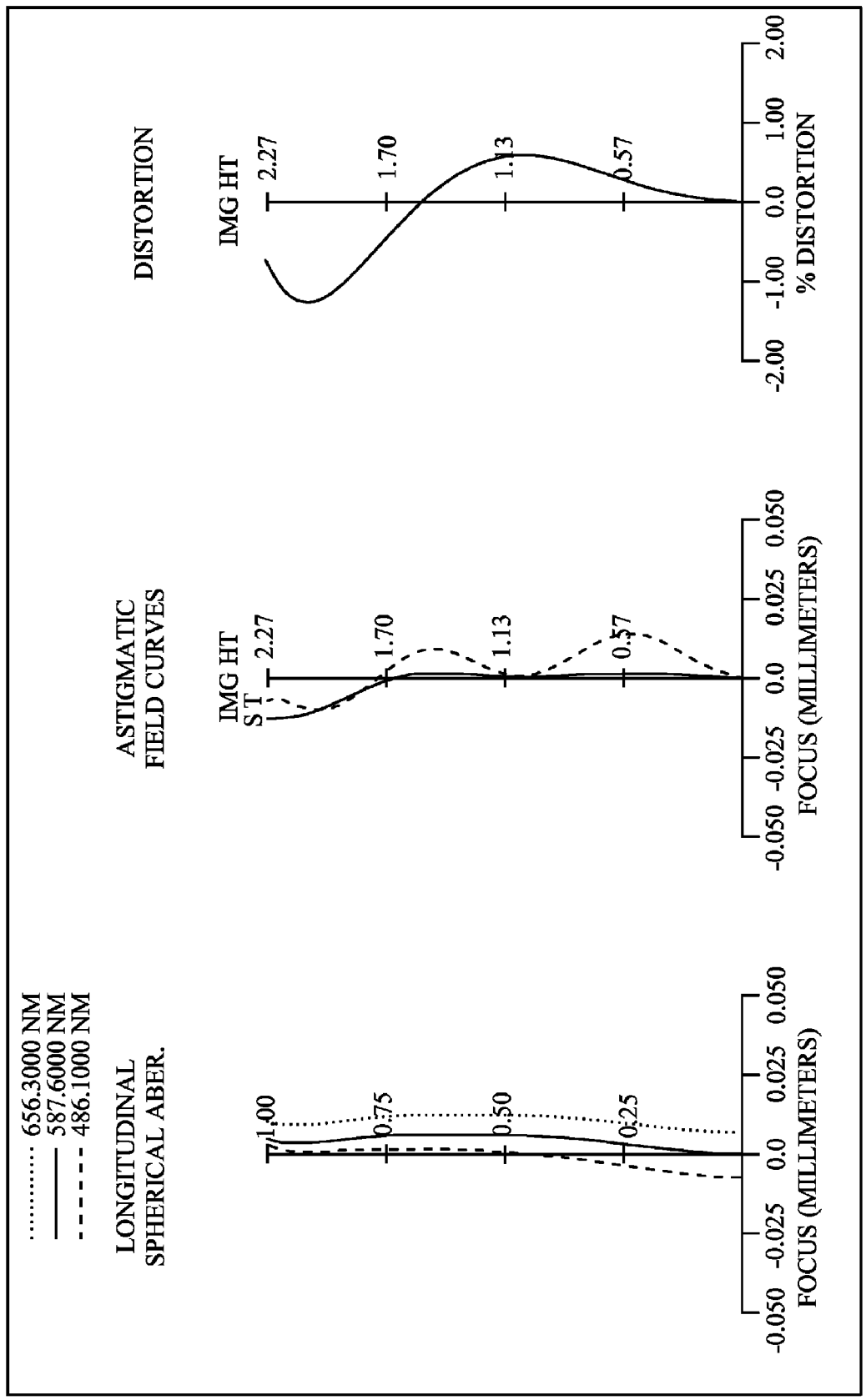
FIG. 3B is a schematic view of a series of aberration curves of the third preferred embodiment of the present invention.

With reference to FIGS. 3A and 3B for a schematic view and a series of aberration curves of an optical lens for image pickup in accordance with the third preferred embodiment of the present invention respectively, the optical lens for image pickup of this preferred embodiment comprises four lens elements, an aperture stop 300 and an IR-filter 360. More specifically, the optical lens for image pickup, sequentially arranged from an object side to an image side along an optical axis, comprises: a plastic first lens element 310 with positive refractive power, having a convex object-side surface 311 and a concave image-side surface 312, and both object-side surface 311 and image-side surface 312 thereof being aspheric; an aperture stop 300; a plastic second lens element 320 with negative refractive power, having a convex object-side surface 321 and a concave image-side surface 322, and both object-side surface 321 and image-side surface 322 thereof being aspheric; a plastic third lens element 330 with positive refractive power, having a concave object-side surface 331 and a convex image-side surface 332, and both object-side surface 331 and image-side surface 332 thereof being aspheric; a plastic fourth lens element 340 with positive refractive power, having a convex object-side surface 341 and a concave image-side surface 342, and both object-side surface 341 and image-side surface 342 thereof being aspheric, and at least one of the object-side surface 341 and the image-side surface 342 having at least one inflection point; a glass IR-filter 360, being made of a panel glass for adjusting a wavelength section of the light of an image; and an image sensor 380 at an image plane 370. With the combination of the four lens elements, the aperture stop 300 and the IR-filter 360, an image of the object to be photographed can be formed at the image sensor 380.

TABLE 7

Optical data of this preferred embodiment f = 3.38 mm, Fno = 2.90, HFOV = 34.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.325890 (ASP) | 0.461 | Plastic | 1.544 | 55.9 | 2.65 |
| 2 | | 14.275000 (ASP) | 0.050 | | | | |
| 3 | Ape. Stop | Plano | 0.020 | | | | |
| 4 | Lens 2 | 2.413980 (ASP) | 0.230 | Plastic | 1.650 | 21.4 | −4.44 |
| 5 | | 1.265240 (ASP) | 0.544 | | | | |
| 6 | Lens 3 | −2.264850 (ASP) | 0.512 | Plastic | 1.544 | 55.9 | 15.32 |
| 7 | | −1.922790 (ASP) | 0.521 | | | | |
| 8 | Lens 4 | 1.261510 (ASP) | 0.632 | Plastic | 1.535 | 56.3 | 34.13 |
| 9 | | 1.118700 (ASP) | 0.600 | | | | |
| 10 | IR-filter | Plano | 0.300 | Glass | 1.516 | 64.1 | — |
| 11 | | Plano | 0.303 | | | | |
| 12 | Image | Plano | — | | | | |

Note:

Reference wavelength is 587.6 nm.

ASP stands for aspherical surfaces.

The optical data of this preferred embodiment are listed in Table 7, wherein the object-side surface and the image-side surface of the first lens element 310 to the fourth lens element 340 comply with the aspherical surface formula as given in Equation (15), and their aspheric coefficients are listed in Table 8 as follows:

TABLE 8

Aspheric coefficients of this preferred embodiment

| | Surface # | | | |
|---|---|---|---|---|
| | 1 | 2 | 4 | 5 |
| k = | −1.06828E−02 | −3.40769E+01 | −3.26928E+01 | 1.63897E+00 |
| A4 = | 2.23769E−02 | −3.48808E−02 | 7.72565E−02 | −2.52437E−01 |
| A6 = | 2.27375E−02 | 2.72496E−01 | −2.22905E−01 | 2.24639E−01 |
| A8 = | 4.35646E−02 | −5.49380E−01 | 3.81232E−01 | −6.89445E−01 |
| A10 = | −1.56208E−02 | 3.64034E−01 | −7.20717E−01 | 7.42416E−01 |
| A12 = | | | | −1.27804E+00 |

| | Surface # | | | |
|---|---|---|---|---|
| | 6 | 7 | 8 | 9 |
| k = | −2.35841E+00 | −3.58077E−02 | −5.00438E+00 | −3.97936E+00 |
| A4 = | −2.63179E−01 | −4.06146E−01 | −2.37944E−01 | −1.50752E−01 |
| A6 = | 1.39406E−01 | 4.78663E−01 | 1.08376E−01 | 6.63485E−02 |
| A8 = | −3.34010E−01 | −5.43624E−01 | −2.13673E−02 | −2.53286E−02 |
| A10 = | 1.82712E−01 | 2.62151E−01 | 2.89959E−04 | 6.39604E−03 |
| A12 = | 4.12067E−01 | | 6.69087E−04 | −1.00129E−03 |
| A14 = | | | −8.17958E−05 | 7.79899E−05 |

With reference to Table 7 and FIG. 3B for the optical lens for image pickup of this preferred embodiment, the focal length of the optical lens for image pickup is f=3.38 (mm), the overall aperture stop value (f-number) of the optical lens for image pickup is Fno=2.90, the half of maximum view angle is HFOV=34.0°. After the optical data of this preferred embodiment are calculated and derived, the optical lens satisfies related conditions as shown in Table 9 below, and the related symbols have been described above and thus will not be described again.

TABLE 9

Data of related relations of this preferred embodiment

| Relation | Data | Relation | Data |
|---|---|---|---|
| $v_1 - v_2$ | 34.5 | $(R_3 - R_4)/(R_3 + R_4)$ | 0.31 |
| $(CT_2/f) * 10$ | 0.68 | $|(R_5 - R_6)/(R_5 + R_6)|$ | 0.08 |
| $T_{12}/T_{23}$ | 0.13 | $|(R_7 - R_8)/(R_7 + R_8)|$ | 0.06 |
| $T_{23}/T_{34}$ | 1.04 | $f/f_3$ | 0.22 |
| $R_1/f$ | 0.39 | $|f_2|/f_3$ | 0.29 |
| $R_4/f$ | 0.37 | TTL/ImgH | 1.80 |

According to the optical data as shown in Table 7 and the aberration curves as shown in FIG. 3B, the optical lens for image pickup in accordance with this preferred embodiment of the present invention provides good correction results in aspects of the longitudinal spherical aberration, astigmatic field curving, and distortion.

Fourth Preferred Embodiment

Figure 4A:
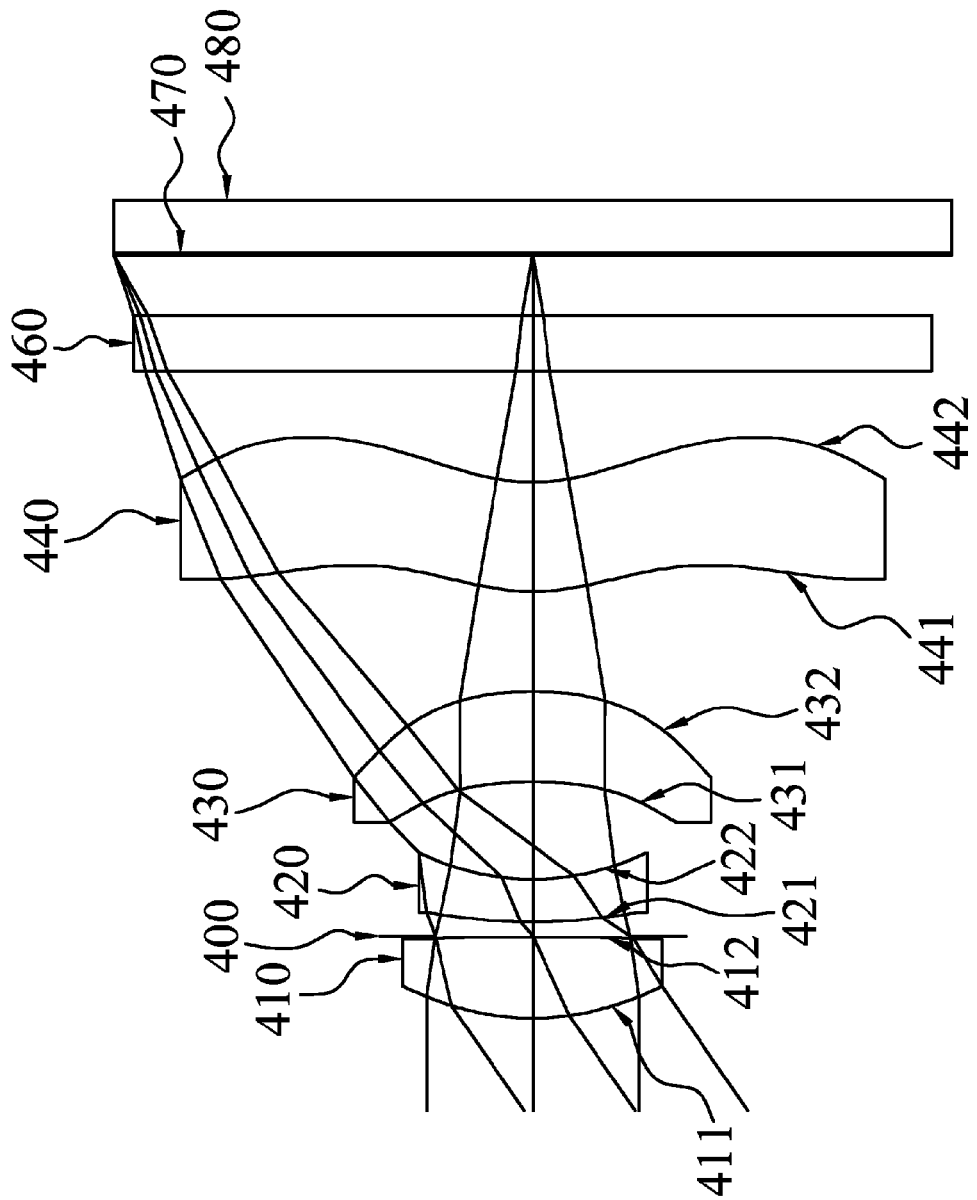
FIG. 4A is a schematic view of an optical lens in accordance with the fourth preferred embodiment of the present invention.
Figure 4B:
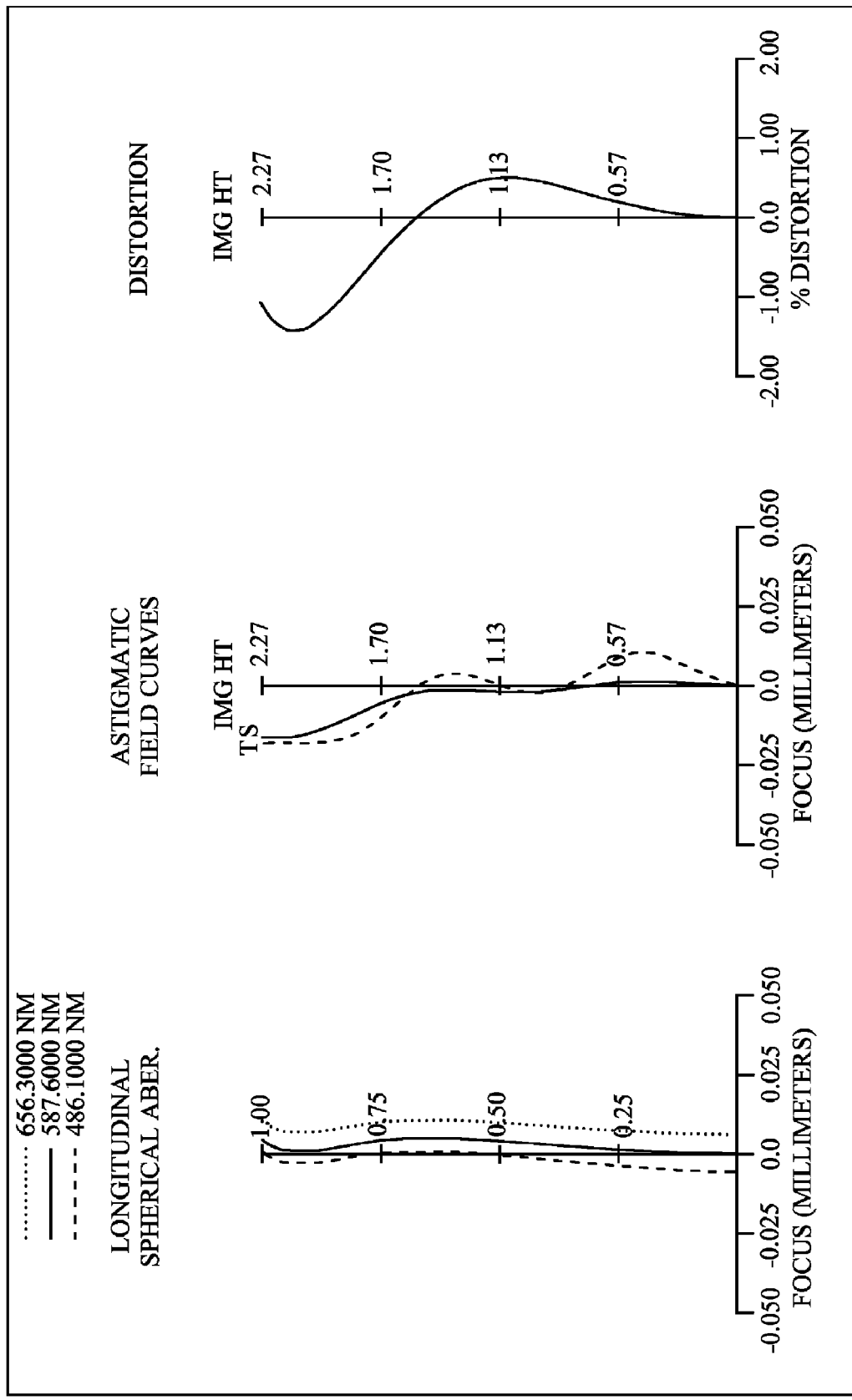
FIG. 4B is a schematic view of a series of aberration curves of the fourth preferred embodiment of the present invention.

With reference to FIGS. 4A and 4B for a schematic view and a series of aberration curves of an optical lens for image pickup in accordance with the fourth preferred embodiment of the present invention respectively, the optical lens for image pickup of this preferred embodiment comprises four lens elements, an aperture stop 400 and an IR-filter 460. More specifically, the optical lens for image pickup, sequentially arranged from an object side to an image side along an optical axis, comprises: a plastic first lens element 410 with positive refractive power, having a convex object-side surface 411 and a convex image-side surface 412, and both object-side surface 411 and image-side surface 412 thereof being aspheric; an aperture stop 400; a plastic second lens element 420 with negative refractive power, having a convex object-side surface 421 and a concave image-side surface 422, and both object-side surface 421 and image-side surface 422 thereof being aspheric; a plastic third lens element 430 with positive refractive power, having a concave object-side surface 431 and a convex image-side surface 432, and both object-side surface 431 and image-side surface 432 thereof being aspheric; a plastic fourth lens element 440 with positive refractive power, having a convex object-side surface 441 and a concave image-side surface 442, and both object-side surface 441 and image-side surface 442 thereof being aspheric, and at least one of the object-side surface 441 and the image-side surface 442 having at least one inflection point; a glass IR-filter 460, being made of a panel glass for adjusting a wavelength section of the light of an image; and an image sensor 480 at an image plane 470. With the combination of the four lens elements, the aperture stop 400 and the IR-filter 460, an image of the object to be photographed can be formed at the image sensor 480.

TABLE 10

Optical data of this preferred embodiment
f = 3.33 mm, Fno = 2.90, HFOV = 34.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.451360 (ASP) | 0.438 | Plastic | 1.544 | 55.9 | 2.58 |
| 2 | | −38.610000 (ASP) | 0.004 | | | | |
| 3 | Ape. Stop | Plano | 0.077 | | | | |
| 4 | Lens 2 | 2.646890 (ASP) | 0.230 | Plastic | 1.650 | 21.4 | −4.36 |
| 5 | | 1.321460 (ASP) | 0.527 | | | | |
| 6 | Lens 3 | −2.147130 (ASP) | 0.488 | Plastic | 1.544 | 55.9 | 16.42 |
| 7 | | −1.869780 (ASP) | 0.541 | | | | |
| 8 | Lens 4 | 1.152470 (ASP) | 0.590 | Plastic | 1.535 | 56.3 | 33.08 |
| 9 | | 1.012950 (ASP) | 0.600 | | | | |
| 10 | IR-filter | Plano | 0.300 | Glass | 1.516 | 64.1 | — |
| 11 | | Plano | 0.327 | | | | |
| 12 | Image | Plano | — | | | | |

Note:
Reference wavelength is 587.6 nm.
ASP stands for aspherical surfaces.

The optical data of this preferred embodiment are listed in Table 10, wherein the object-side surface and the image-side surface of the first lens element 410 to the fourth lens element 440 comply with the aspherical surface formula as given in Equation (15), and their aspheric coefficients are listed in Table 11 as follows:

TABLE 11

Aspheric coefficients of this preferred embodiment

| | Surface # | | | |
|---|---|---|---|---|
| | 1 | 2 | 4 | 5 |
| k = | −3.67979E−01 | −7.03192E+01 | −3.59980E+01 | 1.90425E+00 |
| A4 = | 6.94373E−03 | −7.62775E−02 | 6.03080E−02 | −2.44677E−01 |
| A6 = | −4.72389E−02 | 2.39718E−01 | −1.64776E−02 | 3.17974E−01 |
| A8 = | 1.14364E−01 | −7.12219E−01 | −1.41610E−02 | −9.42666E−01 |
| A10 = | −2.80084E−01 | 5.21979E−01 | −1.61531E−01 | 1.40655E+00 |
| A12 = | | | | −1.96482E+00 |

| | Surface # | | | |
|---|---|---|---|---|
| | 6 | 7 | 8 | 9 |
| k = | −1.63603E+00 | −5.19970E−04 | −4.71886E+00 | −3.93956E+00 |
| A4 = | −3.11333E−01 | −4.59108E−01 | −2.45437E−01 | −1.52632E−01 |
| A6 = | 1.95510E−01 | 6.05835E−01 | 1.11920E−01 | 6.81965E−02 |
| A8 = | −4.61335E−01 | −7.60033E−01 | −2.13107E−02 | −2.57787E−02 |
| A10 = | 1.34454E−01 | 4.03991E−01 | 1.41859E−04 | 6.48915E−03 |
| A12 = | 7.96772E−01 | | 6.38335E−04 | −1.01321E−03 |
| A14 = | | | −7.21936E−05 | 7.84630E−05 |

With reference to Table 10 and FIG. 4B for the optical lens for image pickup of this preferred embodiment, the focal length of the optical lens for image pickup is f=3.33 (mm), the overall aperture stop value (f-number) of the optical lens for image pickup is Fno=2.90, the half of maximum view angle is HFOV=34.5°. After the optical data of this preferred embodiment are calculated and derived, the optical lens satisfies related conditions as shown in Table 12 below, and the related symbols have been described above and thus will not be described again.

TABLE 12

Data of related relations of this preferred embodiment

| Relation | Data | Relation | Data |
|---|---|---|---|
| $v_1 - v_2$ | 34.5 | $(R_3 - R_4)/(R_3 + R_4)$ | 0.33 |
| $(CT_2/f) * 10$ | 0.69 | $|(R_5 - R_6)/(R_5 + R_6)|$ | 0.07 |
| $T_{12}/T_{23}$ | 0.15 | $|(R_7 - R_8)/(R_7 + R_8)|$ | 0.06 |
| $T_{23}/T_{34}$ | 0.97 | $f/f_3$ | 0.20 |
| $R_1/f$ | 0.44 | $|f_2|/f_3$ | 0.27 |
| $R_4/f$ | 0.40 | TTL/ImgH | 1.78 |

According to the optical data as shown in Table 10 and the aberration curves as shown in FIG. 4B, the optical lens for image pickup in accordance with this preferred embodiment of the present invention provides good correction results in aspects of the longitudinal spherical aberration, astigmatic field curving, and distortion.

Fifth Preferred Embodiment

Figure 5A:
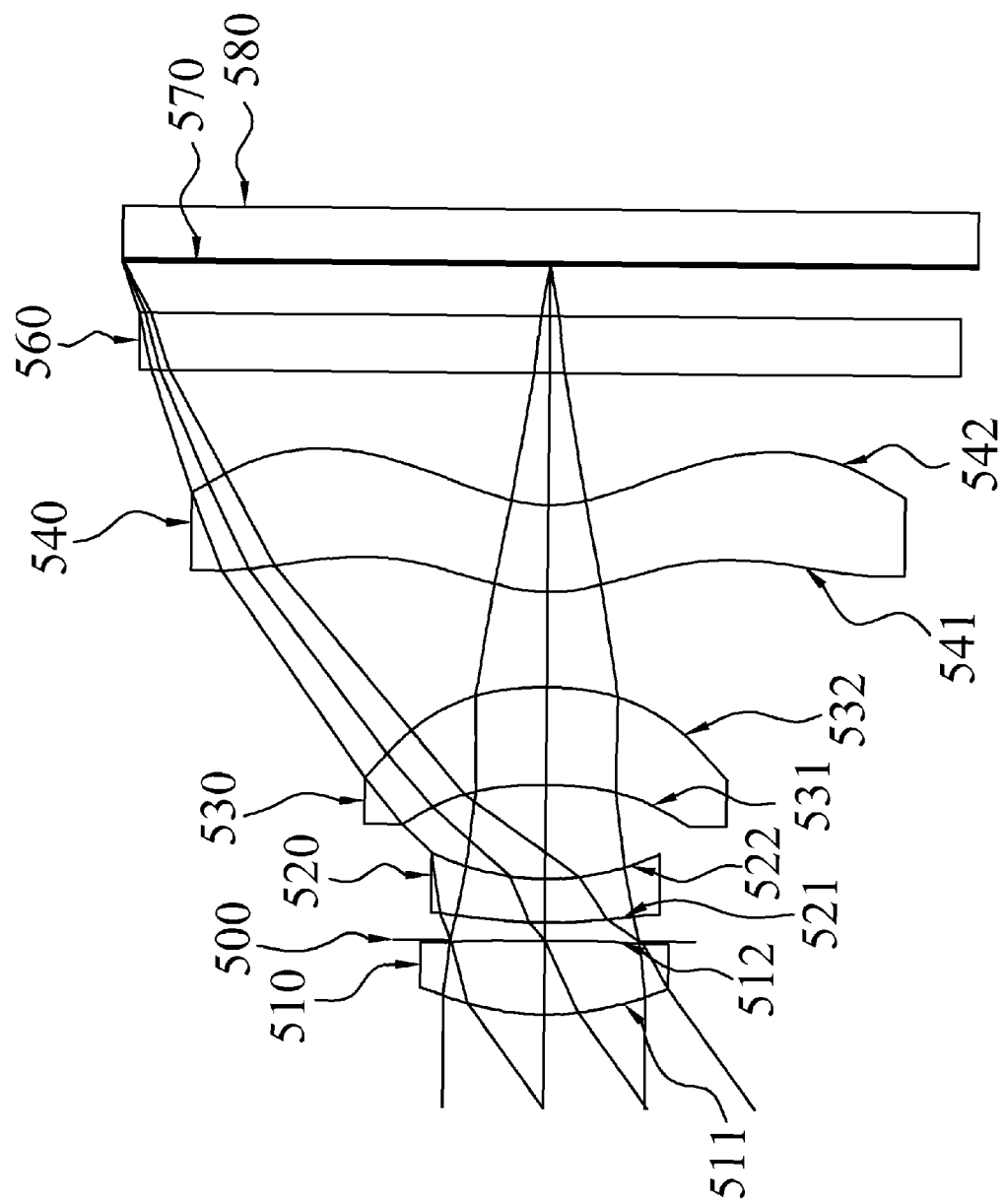
FIG. 5A is a schematic view of an optical lens in accordance with the fifth preferred embodiment of the present invention.
Figure 5B:
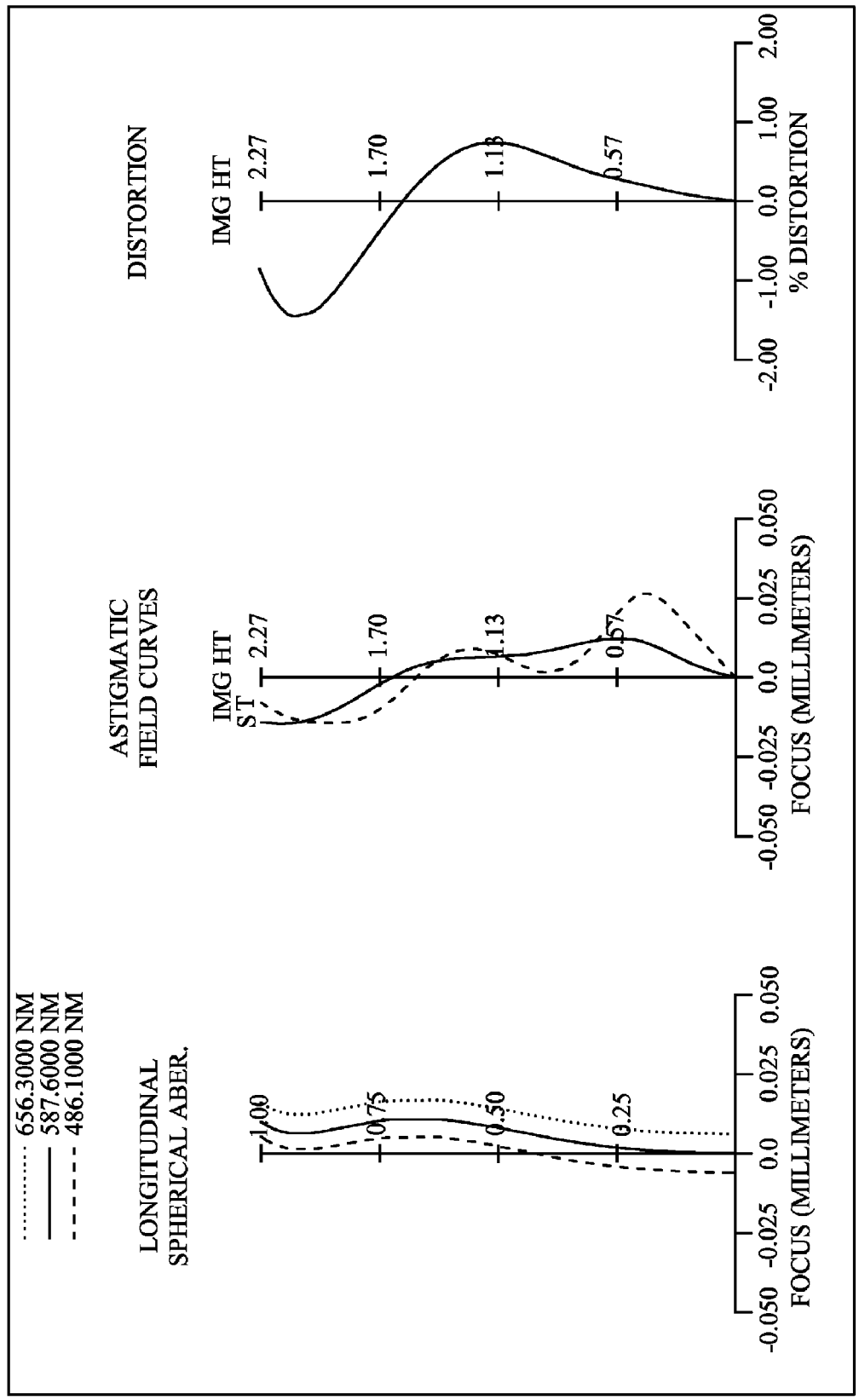
FIG. 5B is a schematic view of a series of aberration curves of the fifth preferred embodiment of the present invention.

With reference to FIGS. 5A and 5B for a schematic view and a series of aberration curves of an optical lens for image pickup in accordance with the fifth preferred embodiment of the present invention respectively, the optical lens for image pickup of this preferred embodiment comprises four lens elements, an aperture stop 500 and an IR-filter 560. More specifically, the optical lens for image pickup, sequentially arranged from an object side to an image side along an optical axis, comprises: a plastic first lens element 510 with positive refractive power, having a convex object-side surface 511 and a convex image-side surface 512, and both object-side surface 511 and image-side surface 512 thereof being aspheric; an aperture stop 500; a plastic second lens element 520 with negative refractive power, having a convex object-side surface 521 and a concave image-side surface 522, and both object-side surface 521 and image-side surface 522 thereof being aspheric; a plastic third lens element 530 with positive refractive power, having a concave object-side surface 531 and a convex image-side surface 532, and both object-side surface 531 and image-side surface 532 thereof being aspheric; a plastic fourth lens element 540 with positive refractive power, having a convex object-side surface 541 and a concave image-side surface 542, and both object-side surface 541 and image-side surface 542 thereof being aspheric, and at least one of the object-side surface 541 and the image-side surface 542 having at least one inflection point; a glass IR-filter 560, being made of a panel glass for adjusting a wavelength section of the light of an image; and an image sensor 580 at an image plane 570. With the combination of the four lens elements, the aperture stop 500 and the IR-filter 560, an image of the object to be photographed can be formed at the image sensor 580.

TABLE 13

Optical data of this preferred embodiment
f = 3.13 mm, Fno = 2.92, HFOV = 36.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.504790 (ASP) | 0.392 | Plastic | 1.544 | 55.9 | 2.54 |
| 2 | | −15.463300 (ASP) | 0.000 | | | | |
| 3 | Ape. Stop | Plano | 0.095 | | | | |
| 4 | Lens 2 | 3.002200 (ASP) | 0.230 | Plastic | 1.650 | 21.4 | −4.33 |
| 5 | | 1.407730 (ASP) | 0.498 | | | | |
| 6 | Lens 3 | −2.016070 (ASP) | 0.518 | Plastic | 1.544 | 55.9 | 12.20 |
| 7 | | −1.686360 (ASP) | 0.504 | | | | |
| 8 | Lens 4 | 0.898130 (ASP) | 0.461 | Plastic | 1.535 | 56.3 | 29.08 |
| 9 | | 0.782760 (ASP) | 0.700 | | | | |
| 10 | IR-filter | Plano | 0.300 | Glass | 1.516 | 64.1 | — |
| 11 | | Plano | 0.272 | | | | |
| 12 | Image | Plano | — | | | | |

Note:

Reference wavelength is 587.6 nm.

ASP stands for aspherical surfaces.

The optical data of this preferred embodiment are listed in Table 13, wherein the object-side surface and the image-side surface of the first lens element 510 to the fourth lens element 540 comply with the aspherical surface formula as given in Equation (15), and their aspheric coefficients are listed in Table 14 as follows:

TABLE 14

Aspheric coefficients of this preferred embodiment

| Surface # | 1 | 2 | 4 | 5 |
|---|---|---|---|---|
| k = | −5.77288E−01 | −7.71819E+01 | −2.07552E+01 | 2.52529E+00 |
| A4 = | −2.86605E−03 | −4.84015E−02 | 1.70870E−02 | −1.84313E−01 |
| A6 = | −7.40912E−02 | −2.04905E−02 | 1.24401E−02 | 1.80039E−01 |
| A8 = | 1.08651E−01 | −4.65126E−01 | −2.16253E−01 | −1.06982E+00 |
| A10 = | −5.33183E−01 | 3.69782E−01 | 1.59852E−01 | 2.16711E+00 |
| A12 = | | | | −3.10136E+00 |

| Surface # | 6 | 7 | 8 | 9 |
|---|---|---|---|---|
| k = | −1.01966E+00 | −1.70971E−03 | −4.16589E+00 | −3.65374E+00 |
| A4 = | −2.76894E−01 | −4.92814E−01 | −2.62394E−01 | −1.65660E−01 |
| A6 = | 1.70832E−01 | 7.62946E−01 | 1.15773E−01 | 7.15984E−02 |
| A8 = | −5.55414E−01 | −9.98371E−01 | −2.10067E−02 | −2.60721E−02 |
| A10 = | 2.84243E−01 | 5.27915E−01 | 2.54852E−05 | 6.44296E−03 |
| A12 = | 8.72022E−01 | | 6.07347E−04 | −1.04292E−03 |
| A14 = | | | −6.41574E−05 | 8.93790E−05 |

With reference to Table 13 and FIG. 5B for the optical lens for image pickup of this preferred embodiment, the focal length of the optical lens for image pickup is f=3.13 (mm), the overall aperture stop value (f-number) of the optical lens for image pickup is Fno=2.92, the half of maximum view angle is HFOV=36.1°. After the optical data of this preferred embodiment are calculated and derived, the optical lens satisfies related conditions as shown in Table 15 below, and the related symbols have been described above and thus will not be described again.

TABLE 15

Data of related relations of this preferred embodiment

| Relation | Data | Relation | Data |
|---|---|---|---|
| $v_1 - v_2$ | 34.5 | $(R_3 - R_4)/(R_3 + R_4)$ | 0.36 |
| $(CT_2/f) * 10$ | 0.73 | $|(R_5 - R_6)/(R_5 + R_6)|$ | 0.09 |
| $T_{12}/T_{23}$ | 0.19 | $|(R_7 - R_8)/(R_7 + R_8)|$ | 0.07 |
| $T_{23}/T_{34}$ | 0.99 | $f/f_3$ | 0.26 |
| $R_1/f$ | 0.48 | $|f_2|/f_3$ | 0.36 |
| $R_4/f$ | 0.45 | TTL/ImgH | 1.71 |

According to the optical data as shown in Table 13 and the aberration curves as shown in FIG. 5B, the optical lens for image pickup in accordance with this preferred embodiment of the present invention provides good correction results in aspects of the longitudinal spherical aberration, astigmatic field curving, and distortion.

Sixth Preferred Embodiment

Figure 6A:
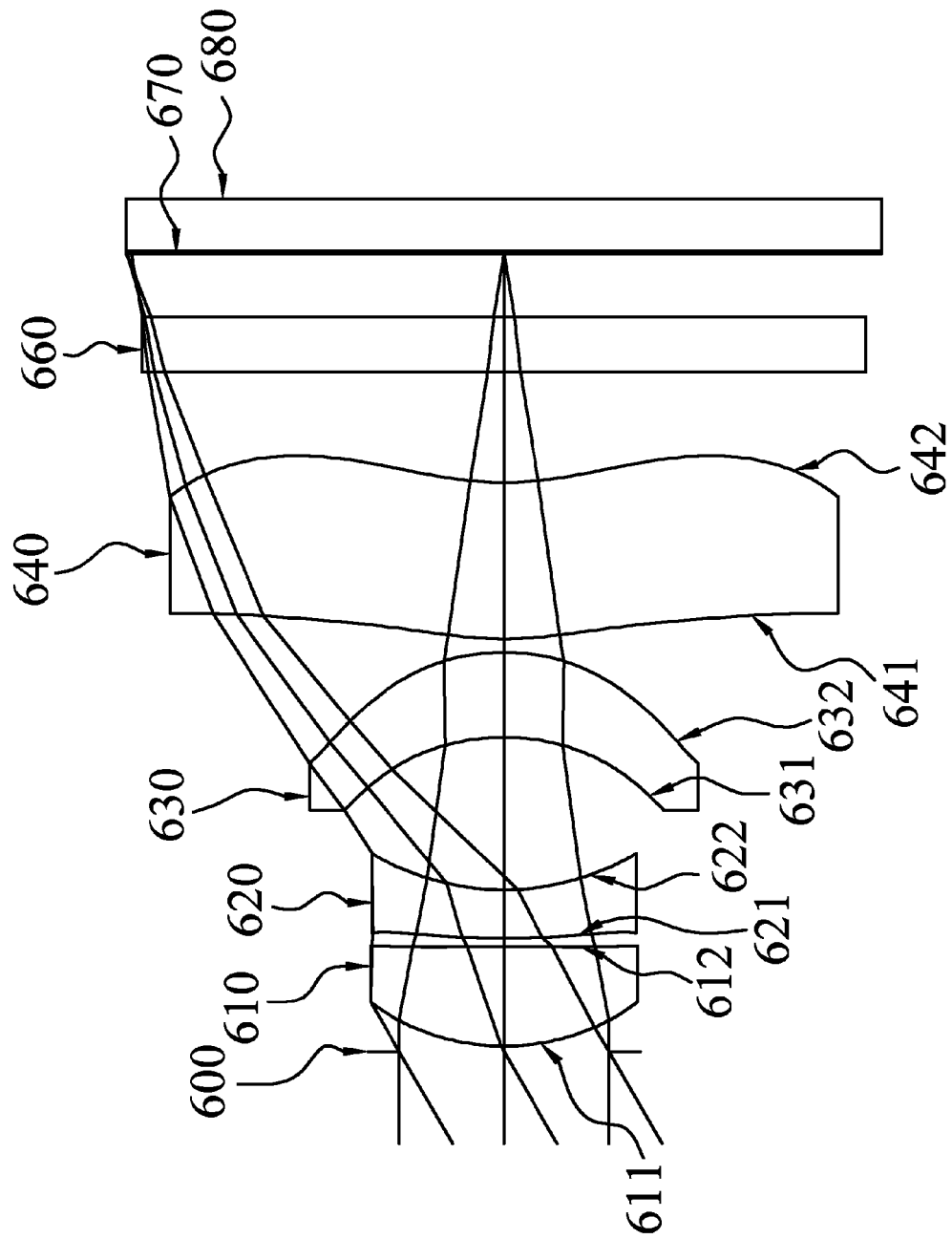
FIG. 6A is a schematic view of an optical lens in accordance with the sixth preferred embodiment of the present invention.
Figure 6B:
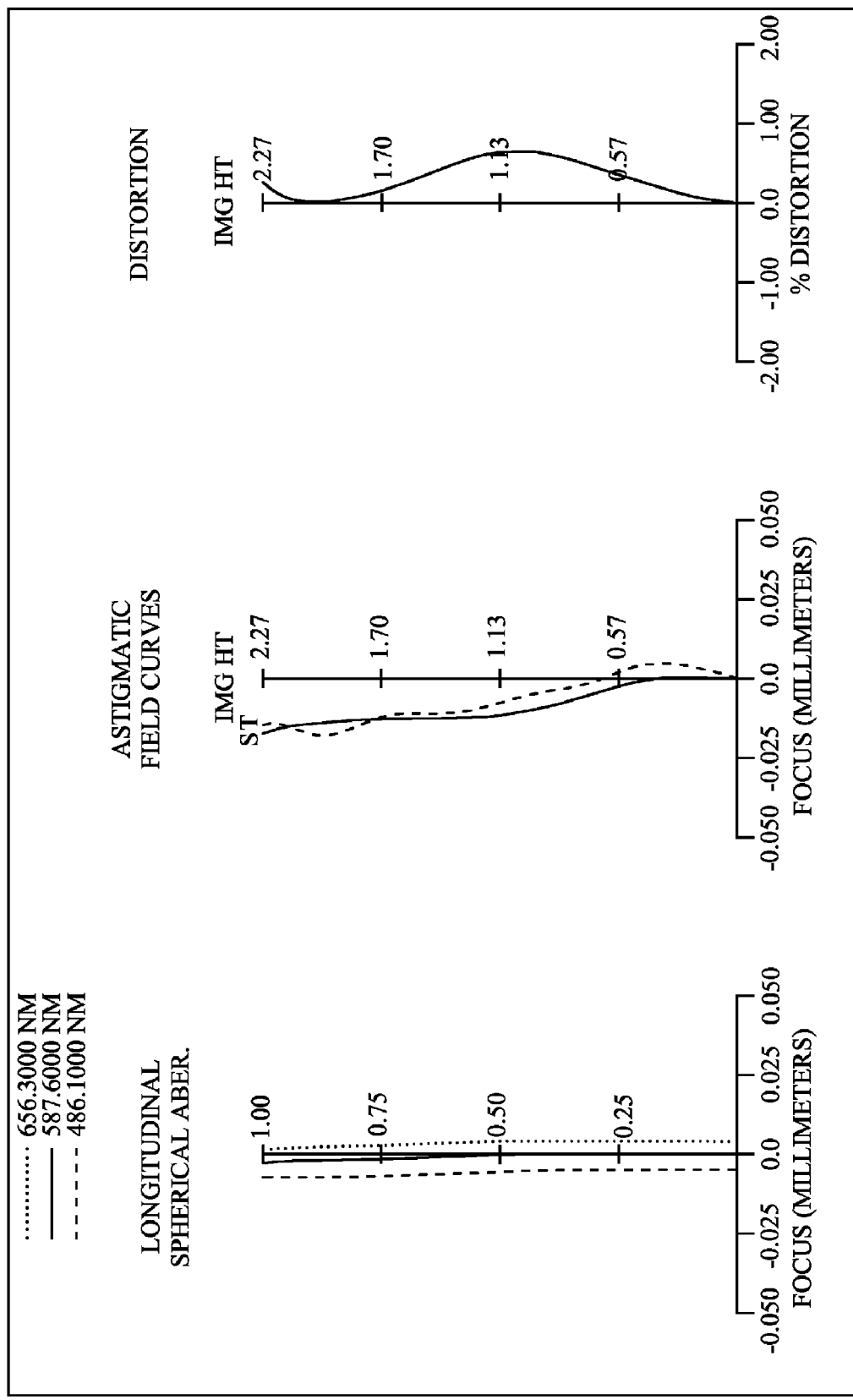
FIG. 6B is a schematic view of a series of aberration curves of the sixth preferred embodiment of the present invention.

With reference to FIGS. 6A and 6B for a schematic view and a series of aberration curves of an optical lens for image pickup in accordance with the sixth preferred embodiment of the present invention respectively, the optical lens for image pickup of this preferred embodiment comprises four lens elements, an aperture stop 600 and an IR-filter 660. More specifically, the optical lens for image pickup, sequentially arranged from an object side to an image side along an optical axis, comprises: an aperture stop 600; a plastic first lens element 610 with positive refractive power, having a convex object-side surface 611 and a convex image-side surface 612, and both object-side surface 611 and image-side surface 612 thereof being aspheric; a plastic second lens element 620 with negative refractive power, having a convex object-side surface 621 and a concave image-side surface 622, and both object-side surface 621 and image-side surface 622 thereof being aspheric; a plastic third lens element 630 with positive refractive power, having a concave object-side surface 631 and a convex image-side surface 632, and both object-side surface 631 and image-side surface 632 thereof being aspheric; a plastic fourth lens element 640 with positive refractive power, having a convex object-side surface 641 and a concave image-side surface 642, and both object-side surface 641 and image-side surface 642 thereof being aspheric, and at least one of the object-side surface 641 and the image-side surface 642 having at least one inflection point; a glass IR-filter 660, being made of a panel glass for adjusting a wavelength section of the light of an image; and an image sensor 680 at an image plane 670. With the combination of the four lens elements, the aperture stop 600 and the IR-filter 660, an image of the object to be photographed can be formed at the image sensor 680.

TABLE 16

Optical data of this preferred embodiment
f = 3.52 mm, Fno = 3.10, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.030 | | | | |
| 2 | Lens 1 | 1.269040 (ASP) | 0.542 | Plastic | 1.544 | 55.9 | 2.20 |
| 3 | | −17.654900 (ASP) | 0.043 | | | | |
| 4 | Lens 2 | 4.209000 (ASP) | 0.262 | Plastic | 1.634 | 23.8 | −3.21 |
| 5 | | 1.338070 (ASP) | 0.827 | | | | |
| 6 | Lens 3 | −1.156260 (ASP) | 0.462 | Plastic | 1.544 | 55.9 | 15.57 |
| 7 | | −1.160640 (ASP) | 0.073 | | | | |
| 8 | Lens 4 | 1.907350 (ASP) | 0.848 | Plastic | 1.535 | 56.3 | 48.28 |
| 9 | | 1.740550 (ASP) | 0.600 | | | | |
| 10 | IR-filter | Plano | 0.300 | Glass | 1.516 | 64.1 | — |
| 11 | | Plano | 0.342 | | | | |
| 12 | Image | Plano | — | | | | |

Note:
Reference wavelength is 587.6 nm.
ASP stands for aspherical surfaces.

The optical data of this preferred embodiment are listed in Table 16, wherein the object-side surface and the image-side surface of the first lens element 610 to the fourth lens element 640 comply with the aspherical surface formula as given in Equation (15), and their aspheric coefficients are listed in Table 17 as follows:

TABLE 17

Aspheric coefficients of this preferred embodiment

| | Surface # | | | |
|---|---|---|---|---|
| | 2 | 3 | 4 | 5 |
| k = | 1.08487E−01 | 1.09160E+01 | −6.86181E+01 | 1.39208E+00 |
| A4 = | 1.23667E−02 | 1.25563E−01 | 7.81655E−02 | −1.66858E−01 |
| A6 = | 5.02354E−02 | −1.68618E−01 | −3.71282E−01 | 2.92660E−02 |
| A8 = | −4.22649E−02 | 3.35539E−01 | 6.82379E−01 | −1.12341E−01 |
| A10 = | 7.55568E−02 | −5.01309E−01 | −9.28099E−01 | 1.12411E−01 |
| A12 = | | | | −1.99796E−01 |

| | Surface # | | | |
|---|---|---|---|---|
| | 6 | 7 | 8 | 9 |
| k = | −6.63866E+00 | −2.00000E−02 | −1.73669E+01 | −2.97618E+00 |
| A4 = | −3.91677E−01 | −1.67689E−01 | −1.13032E−01 | −1.61659E−01 |
| A6 = | 1.06669E−01 | 2.93687E−01 | 7.95613E−02 | 6.88713E−02 |
| A8 = | −1.50341E−01 | −3.05916E−01 | −2.31699E−02 | −2.41566E−02 |
| A10 = | 1.25524E−01 | 1.95476E−01 | 8.97848E−04 | 6.01285E−03 |
| A12 = | 6.54579E−02 | | 7.81834E−04 | −1.00775E−03 |
| A14 = | | | −1.04900E−04 | 7.84643E−05 |

With reference to Table 16 and FIG. 6B for the optical lens for image pickup of this preferred embodiment, the focal length of the optical lens for image pickup is f=3.52 (mm), the overall aperture stop value (f-number) of the optical lens for image pickup is Fno=3.10, the half of maximum view angle is HFOV=30.1°. After the optical data of this preferred embodiment are calculated and derived, the optical lens satisfies related conditions as shown in Table 18 below, and the related symbols have been described above and thus will not be described again.

TABLE 18

Data of related relations of this preferred embodiment

| Relation | Data | Relation | Data |
|---|---|---|---|
| $v_1 - v_2$ | 32.1 | $(R_3 - R_4)/(R_3 + R_4)$ | 0.52 |
| $(CT_2/f) * 10$ | 0.74 | $|(R_5 - R_6)/(R_5 + R_6)|$ | 0.00 |
| $T_{12}/T_{23}$ | 0.05 | $|(R_7 - R_8)/(R_7 + R_8)|$ | 0.05 |
| $T_{23}/T_{34}$ | 11.33 | $f/f_3$ | 0.23 |
| $R_1/f$ | 0.36 | $|f_2|/f_3$ | 0.21 |
| $R_4/f$ | 0.38 | TTL/ImgH | 2.06 |

According to the optical data as shown in Table 16 and the aberration curves as shown in FIG. 6B, the optical lens for image pickup in accordance with this preferred embodiment of the present invention provides good correction results in aspects of the longitudinal spherical aberration, astigmatic field curving, and distortion.

Seventh Preferred Embodiment

Figure 7A:
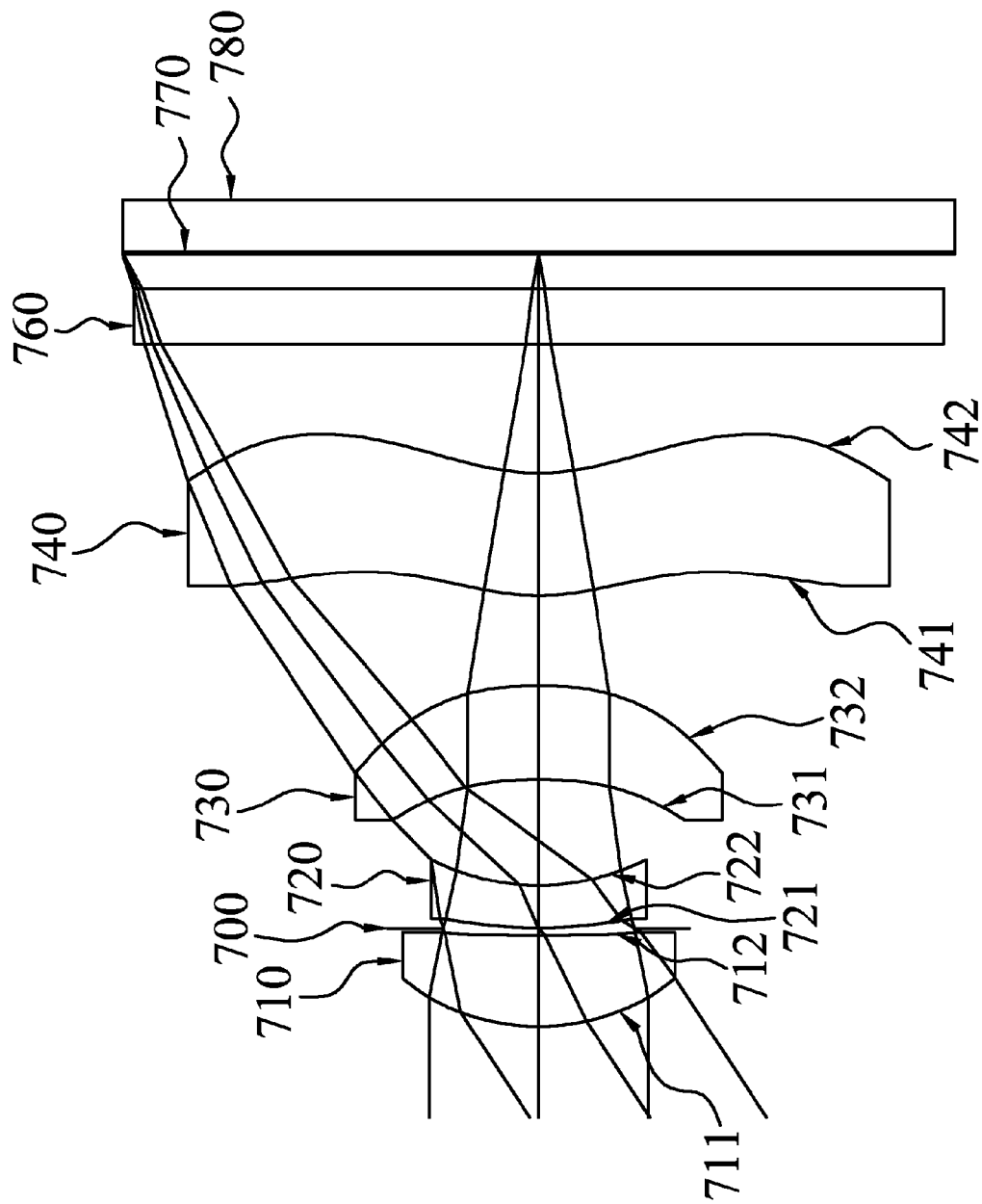
FIG. 7A is a schematic view of an optical lens in accordance with the seventh preferred embodiment of the present invention.
Figure 7B:
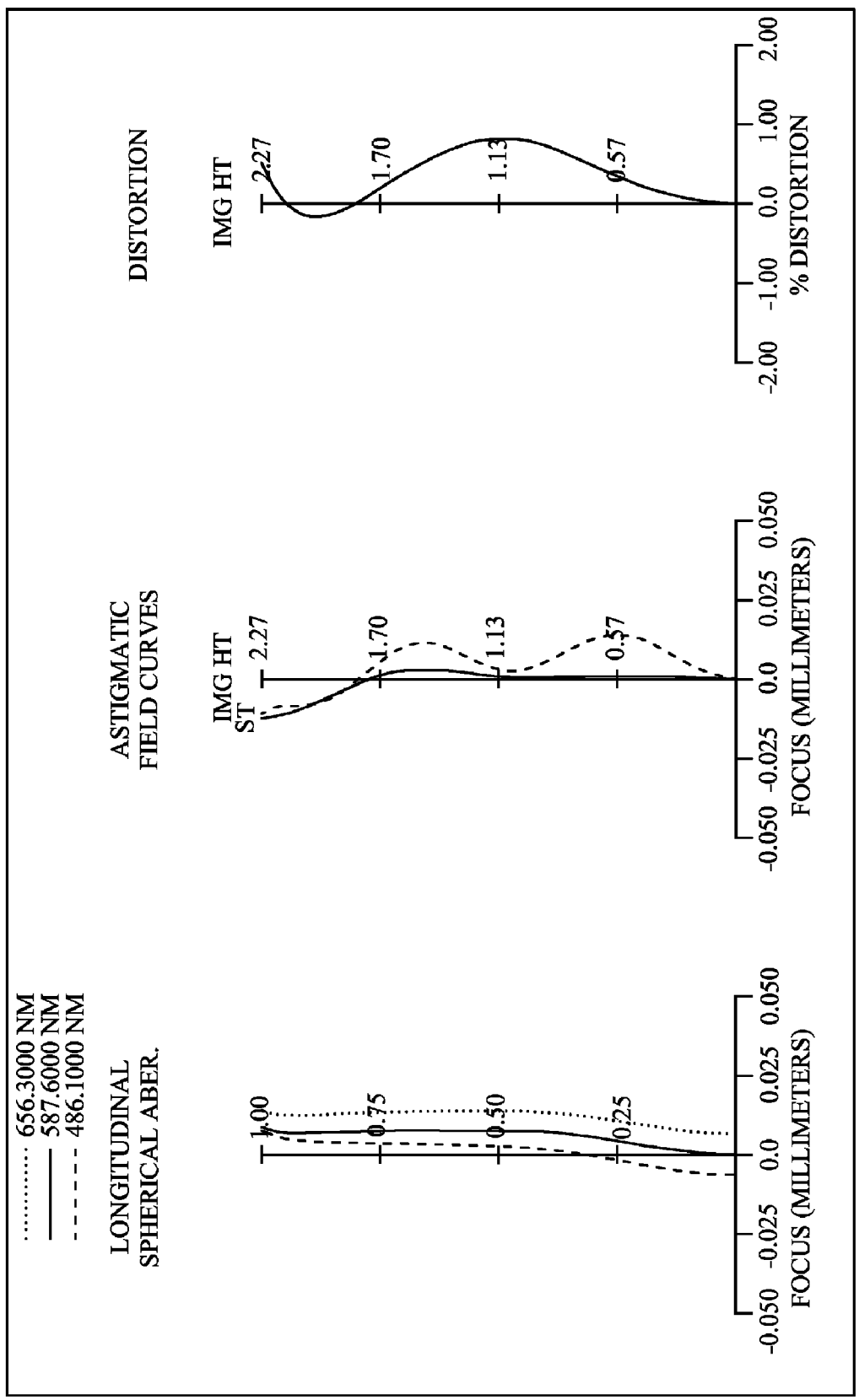
FIG. 7B is a schematic view of a series of aberration curves of the seventh preferred embodiment of the present invention.

With reference to FIGS. 7A and 7B for a schematic view and a series of aberration curves of an optical lens for image pickup in accordance with the seventh preferred embodiment of the present invention respectively, the optical lens for image pickup of this preferred embodiment comprises four lens elements, an aperture stop 700 and an IR-filter 760. More specifically, the optical lens for image pickup, sequentially arranged from an object side to an image side along an optical axis, comprises: a plastic first lens element 710 with positive refractive power, having a convex object-side surface 711 and a concave image-side surface 712, and both object-side surface 711 and image-side surface 712 thereof being aspheric; an aperture stop 700; a plastic second lens element 720 with negative refractive power, having a convex object-side surface 721 and a concave image-side surface 722, and both object-side surface 721 and image-side surface 722 thereof being aspheric; a plastic third lens element 730 with positive refractive power, having a concave object-side surface 731 and a convex image-side surface 732, and both object-side surface 731 and image-side surface 732 thereof being aspheric; a plastic fourth lens element 740 with positive refractive power, having a convex object-side surface 741 and a concave image-side surface 742, and both object-side surface 741 and image-side surface 742 thereof being aspheric, and at least one of the object-side surface 741 and the image-side surface 742 having at least one inflection point; a glass IR-filter 760, being made of a panel glass for adjusting a wavelength section of the light of an image; and an image sensor 780 at an image plane 770. With the combination of the four lens elements, the aperture stop 700 and the IR-filter 760, an image of the object to be photographed can be formed at the image sensor 780.

TABLE 19

Optical data of this preferred embodiment
f = 3.42 mm, Fno = 2.87, HFOV = 33.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.267150 (ASP) | 0.494 | Plastic | 1.544 | 55.9 | 2.56 |
| 2 | | 12.123900 (ASP) | 0.040 | | | | |
| 3 | Ape. Stop | Plano | 0.001 | | | | |
| 4 | Lens 2 | 2.338050 (ASP) | 0.230 | Plastic | 1.650 | 21.4 | -4.25 |
| 5 | | 1.216840 (ASP) | 0.577 | | | | |
| 6 | Lens 3 | -2.119960 (ASP) | 0.509 | Plastic | 1.544 | 55.9 | 27.82 |
| 7 | | -2.016900 (ASP) | 0.490 | | | | |
| 8 | Lens 4 | 1.299860 (ASP) | 0.667 | Plastic | 1.535 | 56.3 | 19.15 |
| 9 | | 1.222780 (ASP) | 0.700 | | | | |
| 10 | IR-filter | Plano | 0.300 | Glass | 1.516 | 64.1 | — |
| 11 | | Plano | 0.190 | | | | |
| 12 | Image | Plano | — | | | | |

Note:

Reference wavelength is 587.6 nm.

ASP stands for aspherical surfaces.

The optical data of this preferred embodiment are listed in Table 19, wherein the object-side surface and the image-side surface of the first lens element 710 to the fourth lens element 740 comply with the aspherical surface formula as given in Equation (15), and their aspheric coefficients are listed in Table 20 as follows:

TABLE 20

Aspheric coefficients of this preferred embodiment

| Surface # | 1 | 2 | 4 | 5 |
|---|---|---|---|---|
| k = | 4.58604E−02 | −9.00000E+01 | −2.99746E+01 | 1.55375E+00 |
| A4 = | 2.63530E−02 | 1.54046E−02 | 1.09842E−01 | −2.46683E−01 |
| A6 = | 5.69786E−02 | 2.51590E−01 | −2.97333E−01 | 1.40807E−01 |
| A8 = | −3.60552E−02 | −5.39697E−01 | 4.12053E−01 | −5.69070E−01 |
| A10 = | 1.38319E−01 | 3.58142E−01 | −8.61873E−01 | 4.48754E−01 |
| A12 = | | | | −1.15754E+00 |

| Surface # | 6 | 7 | 8 | 9 |
|---|---|---|---|---|
| k = | −2.16341E+00 | −5.82157E−17 | −4.97536E+00 | −3.77390E+00 |
| A4 = | −2.62391E−01 | −4.17918E−01 | −2.30419E−01 | −1.53100E−01 |
| A6 = | 1.40768E−01 | 4.82330E−01 | 1.06331E−01 | 6.70517E−02 |
| A8 = | −3.21112E−01 | −5.21093E−01 | −2.15663E−02 | −2.53109E−02 |
| A10 = | 1.49153E−01 | 2.44507E−01 | 3.50709E−04 | 6.37677E−03 |
| A12 = | 4.25407E−01 | | 6.87662E−04 | −9.92470E−04 |
| A14 = | | | −8.59280E−05 | 7.57729E−05 |

With reference to Table 19 and FIG. 7B for the optical lens for image pickup of this preferred embodiment, the focal length of the optical lens for image pickup is f=3.42 (mm), the overall aperture stop value (f-number) of the optical lens for image pickup is Fno=2.87, the half of maximum view angle is HFOV=33.3°. After the optical data of this preferred embodiment are calculated and derived, the optical lens satisfies related conditions as shown in Table 21 below, and the related symbols have been described above and thus will not be described again.

TABLE 21

Data of related relations of this preferred embodiment

| Relation | Data | Relation | Data |
|---|---|---|---|
| $v_1 − v_2$ | 34.5 | $(R_3 − R_4)/(R_3 + R_4)$ | 0.32 |
| $(CT_2/f) * 10$ | 0.67 | $|(R_5 − R_6)/(R_5 + R_6)|$ | 0.02 |
| $T_{12}/T_{23}$ | 0.07 | $|(R_7 − R_8)/(R_7 + R_8)|$ | 0.03 |
| $T_{23}/T_{34}$ | 1.18 | $f/f_3$ | 0.12 |
| $R_1/f$ | 0.37 | $|f_2|/f_3$ | 0.15 |
| $R_4/f$ | 0.36 | TTL/ImgH | 1.81 |

According to the optical data as shown in Table 19 and the aberration curves as shown in FIG. 7B, the optical lens for image pickup in accordance with this preferred embodiment of the present invention provides good correction results in aspects of the longitudinal spherical aberration, astigmatic field curving, and distortion.

Eighth Preferred Embodiment

Figure 8A:
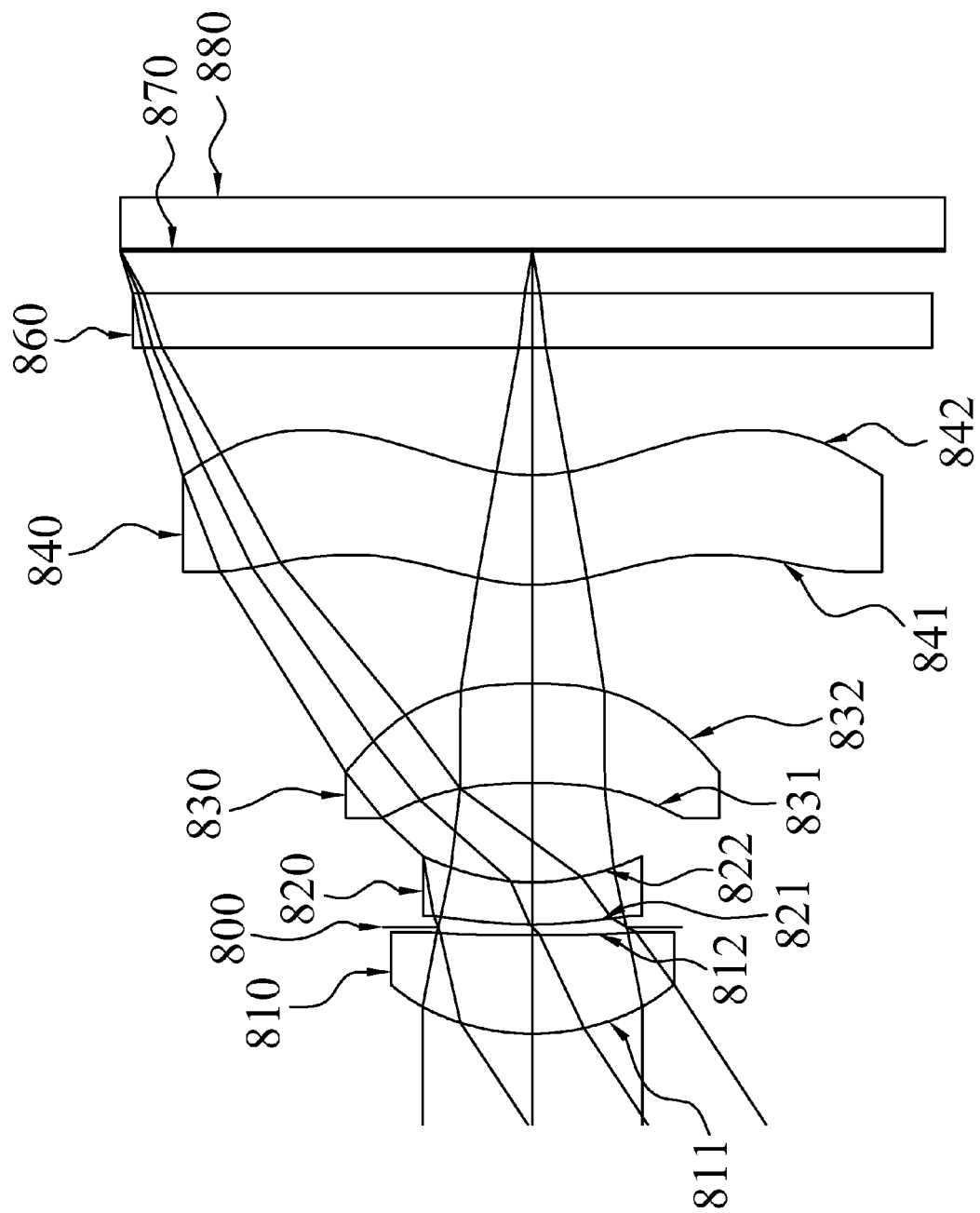
FIG. 8A is a schematic view of an optical lens in accordance with the eighth preferred embodiment of the present invention.
Figure 8B:
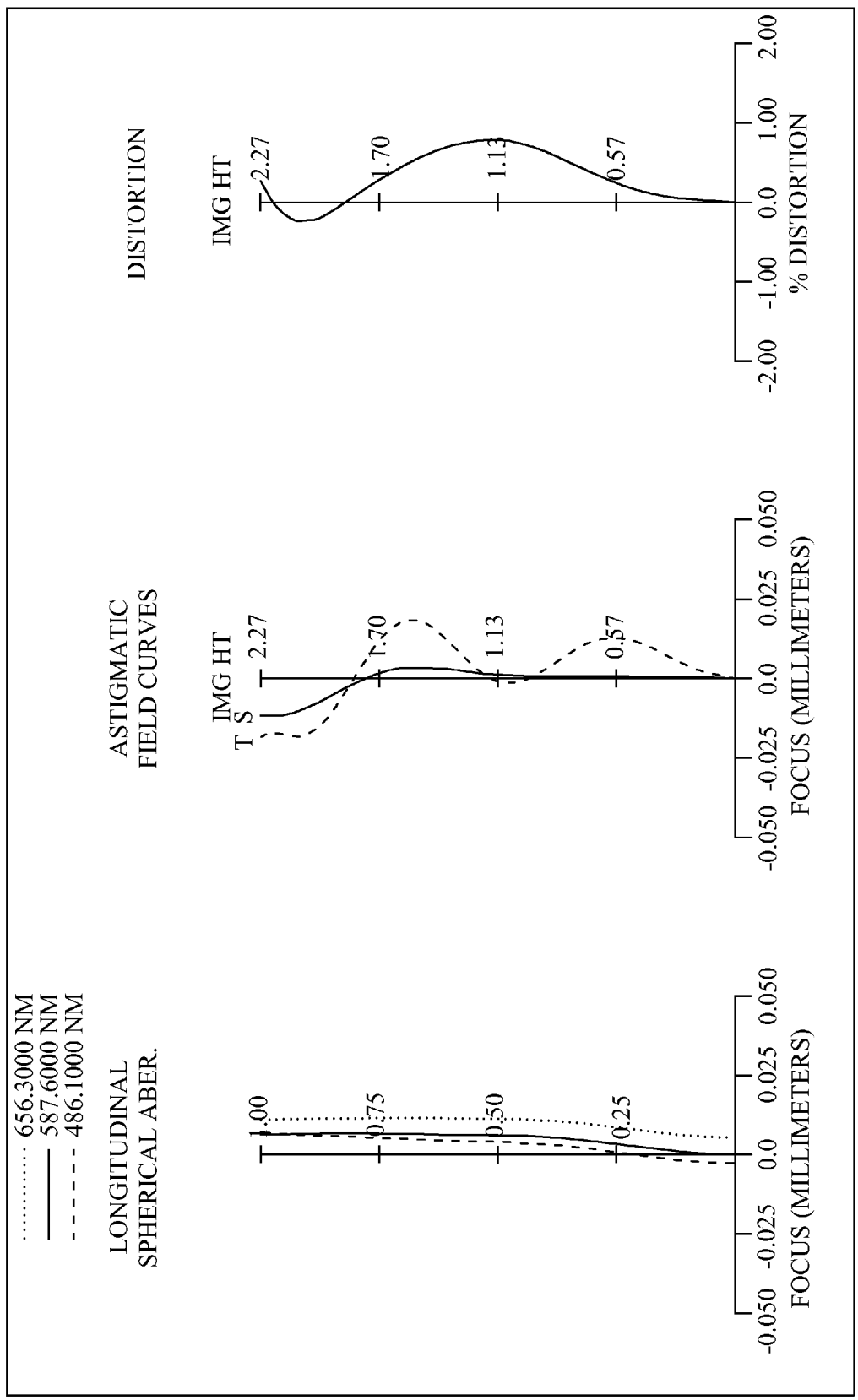
FIG. 8B is a schematic view of a series of aberration curves of the eighth preferred embodiment of the present invention.

With reference to FIGS. 8A and 8B for a schematic view and a series of aberration curves of an optical lens for image pickup in accordance with the eighth preferred embodiment of the present invention respectively, the optical lens for image pickup of this preferred embodiment comprises four lens elements, an aperture stop 800 and an IR-filter 860. More specifically, the optical lens for image pickup, sequentially arranged from an object side to an image side along an optical axis, comprises: a plastic first lens element 810 with positive refractive power, having a convex object-side surface 811 and a concave image-side surface 812, and both object-side surface 811 and image-side surface 812 thereof being aspheric; an aperture stop 800; a plastic second lens element 820 with negative refractive power, having a convex object-side surface 821 and a concave image-side surface 822, and both object-side surface 821 and image-side surface 822 thereof being aspheric; a plastic third lens element 830 with positive refractive power, having a concave object-side surface 831 and a convex image-side surface 832, and both object-side surface 831 and image-side surface 832 thereof being aspheric; a plastic fourth lens element 840 with positive refractive power, having a convex object-side surface 841 and a concave image-side surface 842, and both object-side surface 841 and image-side surface 842 thereof being aspheric, and at least one of the object-side surface 841 and the image-side surface 842 having at least one inflection point; a glass IR-filter 860, being made of a panel glass for adjusting a wavelength section of the light of an image; and an image sensor 880 at an image plane 870. With the combination of the four lens elements, the aperture stop 800 and the IR-filter 860, an image of the object to be photographed can be formed at the image sensor 880.

TABLE 22

Optical data of this preferred embodiment
f = 3.42 mm, Fno = 2.85, HFOV = 33.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.357900 (ASP) | 0.542 | Plastic | 1.544 | 55.9 | 2.63 |
| 2 | | 22.891300 (ASP) | 0.042 | | | | |
| 3 | Ape. Stop | Plano | 0.016 | | | | |
| 4 | Lens 2 | 2.479490 (ASP) | 0.231 | Plastic | 1.650 | 21.4 | −3.89 |
| 5 | | 1.205740 (ASP) | 0.545 | | | | |
| 6 | Lens 3 | −2.761610 (ASP) | 0.546 | Plastic | 1.544 | 55.9 | 15.56 |
| 7 | | −2.227420 (ASP) | 0.542 | | | | |
| 8 | Lens 4 | 1.134750 (ASP) | 0.600 | Plastic | 1.535 | 56.3 | 16.69 |
| 9 | | 1.060660 (ASP) | 0.700 | | | | |
| 10 | IR-filter | Plano | 0.300 | Glass | 1.516 | 64.1 | — |
| 11 | | Plano | 0.228 | | | | |
| 12 | Image | Plano | — | | | | |

Note:
Reference wavelength is 587.6 nm.
ASP stands for aspherical surfaces.

The optical data of this preferred embodiment are listed in Table 22, wherein the object-side surface and the image-side surface of the first lens element 810 to the fourth lens element 840 comply with the aspherical surface formula as given in Equation (15), and their aspheric coefficients are listed in Table 23 as follows:

TABLE 23

Aspheric coefficients of this preferred embodiment

| | Surface # | | | |
|---|---|---|---|---|
| | 1 | 2 | 4 | 5 |
| k = | 2.96124E−02 | −9.00000E+01 | −3.18530E+01 | 1.18475E+00 |
| A4 = | 2.77385E−02 | 5.31752E−02 | 7.67451E−02 | −2.87424E−01 |
| A6 = | 5.02042E−02 | 1.03699E−01 | −3.01960E−01 | 2.32969E−01 |
| A8 = | −2.93692E−02 | −1.92632E−01 | 4.30269E−01 | −6.88366E−01 |
| A10 = | 1.01766E−01 | 6.12670E−02 | −7.56449E−01 | 4.39077E−01 |
| A12 = | | | | −3.90517E−01 |

| | Surface # | | | |
|---|---|---|---|---|
| | 6 | 7 | 8 | 9 |
| k = | −2.21556E+00 | −2.51470E−02 | −3.49405E+00 | −3.25124E+00 |
| A4 = | −2.26762E−01 | −4.06988E−01 | −2.47203E−01 | −1.65013E−01 |
| A6 = | 1.59884E−01 | 4.55409E−01 | 1.05586E−01 | 7.15536E−02 |
| A8 = | −3.38367E−01 | −4.62874E−01 | −2.10892E−02 | −2.58394E−02 |
| A10 = | 3.13744E−01 | 1.90065E−01 | 4.64582E−04 | 6.26920E−03 |
| A12 = | 9.06079E−02 | | 6.98447E−04 | −9.89401E−04 |
| A14 = | | | −9.27712E−05 | 8.08507E−05 |

With reference to Table 22 and FIG. 8B for the optical lens for image pickup of this preferred embodiment, the focal length of the optical lens for image pickup is f=3.42 (mm), the overall aperture stop value (f-number) of the optical lens for image pickup is Fno=2.85, the half of maximum view angle is HFOV=33.3°. After the optical data of this preferred embodiment are calculated and derived, the optical lens satisfies related conditions as shown in Table 24 below, and the related symbols have been described above and thus will not be described again.

TABLE 24

Data of related relations of this preferred embodiment

| Relation | Data | Relation | Data |
|---|---|---|---|
| $v_1 - v_2$ | 34.5 | $(R_3 - R_4)/(R_3 + R_4)$ | 0.35 |
| $(CT_2/f) * 10$ | 0.68 | $|(R_5 - R_6)/(R_5 + R_6)|$ | 0.11 |
| $T_{12}/T_{23}$ | 0.11 | $|(R_7 - R_8)/(R_7 + R_8)|$ | 0.03 |
| $T_{23}/T_{34}$ | 1.00 | $f/f_3$ | 0.22 |
| $R_1/f$ | 0.40 | $|f_2|/f_3$ | 0.25 |
| $R_4/f$ | 0.35 | TTL/ImgH | 1.86 |

According to the optical data as shown in Table 22 and the aberration curves as shown in FIG. 8B, the optical lens for image pickup in accordance with this preferred embodiment of the present invention provides good correction results in aspects of the longitudinal spherical aberration, astigmatic field curving, and distortion.

In the optical lens for image pickup of the present invention, the lens element can be made of glass or plastic. If the lens element is made of glass, the selection of refractive power for the optical lens for image pickup can be more flexible. If the lens element is made of plastic, then the production cost can be reduced effectively.

In the optical lens for image pickup of the present invention, if the lens element has a convex surface, then the surface of the lens element is convex at a position near the optical axis; and if the lens element has a concave surface, then the surface of the lens element is concave at a position near the optical axis.

In the optical lens for image pickup of the present invention, at least one aperture stop (not as shown in figure) such as a glare stop or a field stop is provided for reducing stray lights to improve the image quality.

Tables 1 to 24 show changes of values of an optical lens for image pickup in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens for image pickup, sequentially arranged from an object side to an image side, comprising:
    a first lens element with positive refractive power, having a convex object-side surface;
    a second lens element with negative refractive power, having a convex object-side surface and a concave image-side surface;
    a plastic third lens element with positive refractive power, having a concave object-side surface and a convex image-side surface, and both object-side surface and image-side surface thereof being aspheric; and
    a plastic fourth lens element with positive refractive power, having a convex object-side surface and a concave image-side surface, and both object-side surface and image-side surface thereof being aspheric;
    wherein $R_3$ is a curvature radius of the object-side surface of the second lens element, $R_4$ is a curvature radius of the image-side surface of the second lens element, $R_5$ is a curvature radius of the object-side surface of the third lens element, $R_6$ is a curvature radius of the image-side surface of the third lens element, f is a focal length of the optical lens for image pickup, and the following relations are satisfied:

$$0.20 < (R_3 - R_4)/(R_3 + R_4) < 0.70;$$

$$|(R_5 - R_6)/(R_5 + R_6)| < 0.21; \text{ and}$$

$$0.1 < R_4/f < 0.5.$$

2. The optical lens for image pickup of claim 1, wherein at least one of the object-side surface and the image-side surface of the fourth lens element has at least one inflection point.

3. The optical lens for image pickup of claim 2, wherein $R_7$ is a curvature radius of the object-side surface of the fourth lens element, $R_8$ is a curvature radius of the image-side surface of the fourth lens element, and the following relation is satisfied:

$$|(R_7 - R_8)/(R_7 + R_8)| < 0.18.$$

4. The optical lens for image pickup of claim 3, wherein $v_1$ is an Abbe number of the first lens element, $v_2$ is an Abbe number of the second lens element, and the following relation is satisfied:

$$28 < v_1 - v_2 < 42.$$

5. The optical lens for image pickup of claim 4, wherein $R_3$ is the curvature radius of the object-side surface of the second lens element, $R_4$ is the curvature radius of the image-side surface of the second lens element, and the following relation is satisfied:

$$0.3 < (R_3 - R_4)/(R_3 + R_4) < 0.52.$$

6. The optical lens for image pickup of claim 4, wherein f is the focal length of the optical lens for image pickup, $f_3$ is a focal length of the third lens element, and the following relation is satisfied:

$$0 < f/f_3 < 0.40.$$

7. The optical lens for image pickup of claim 4, wherein $f_2$ is a focal length of the second lens element, $f_3$ is a focal length of the third lens element, and the following relation is satisfied:

$$0 < |f_2|/f_3 < 0.5.$$

8. The optical lens for image pickup of claim 5, wherein $T_{12}$ is an axial distance between the first lens element and the second lens element, $T_{23}$ is an axial distance between the second lens element and the third lens element, and the following relation is satisfied:

$$0 < T_{12}/T_{23} < 0.4.$$

9. The optical lens for image pickup of claim 8, wherein $R_1$ is a curvature radius of the object-side surface of the first lens element, and f is the focal length of the optical lens for image pickup, and the following relation is satisfied:

$$0.2 < R_1/f < 0.5.$$

10. The optical lens for image pickup of claim 3, wherein $T_{23}$ is an axial distance between the second lens element and the third lens element, $T_{34}$ is an axial distance between the third lens element and the fourth lens element, and the following relation is satisfied:

$$0.5 < T_{23}/T_{34} < 1.5.$$

11. The optical lens for image pickup of claim 3, wherein $CT_2$ is a central thickness of the second lens element, f is the focal length of the optical lens for image pickup, and the following relation is satisfied:

$$0.2 < (CT_2/f)*10 < 0.8.$$

12. The optical lens for image pickup of claim 3, wherein the first lens element has a concave image-side surface.

13. The optical lens for image pickup of claim 3, further comprising an image sensor at an image plane for imaging an object to be photographed, wherein TTL is an axial distance from the object-side surface of the first lens element to the image plane, ImgH is half of the diagonal length of an effective photosensitive area of the image sensor, and the following relation is satisfied:

$$TTL/ImgH < 2.1.$$

14. An optical lens for image pickup, sequentially arranged from an object side to an image side, comprising:
   a first lens element with positive refractive power, having a convex object-side surface;
   a second lens element with negative refractive power, having a convex object-side surface and a concave image-side surface;
   a plastic third lens element with positive refractive power, having a concave object-side surface and a convex image-side surface, and both object-side surface and image-side surface thereof being aspheric; and
   a plastic fourth lens element with positive refractive power, having a convex object-side surface and a concave image-side surface, and both object-side surface and image-side surface thereof being aspheric;
   wherein f is a focal length of the optical lens for image pickup, $f_3$ is a focal length of the third lens element, $R_3$ is a curvature radius of the object-side surface of the second lens element, $R_4$ is a curvature radius of the image-side surface of the second lens element, $R_7$ is a curvature radius of the object-side surface of the fourth lens element, $R_8$ is a curvature radius of the image-side surface of the fourth lens element, and the following relations are satisfied:

$$0.20 < (R_3-R_4)/(R_3+R_4) < 0.70;$$

$$|(R_7-R_8)/(R_7+R_8)| < 0.18;$$

$$0.1 < R_4/f < 0.5; \text{ and}$$

$$0 < f/f_3 < 0.40.$$

15. The optical lens for image pickup of claim 14, wherein at least one of the object-side surface and the image-side surface of the fourth lens element has at least one inflection point.

16. The optical lens for image pickup of claim 15, wherein $f_2$ is a focal length of the second lens element, $f_3$ is the focal length of the third lens element, and the following relation is satisfied:

$$0 < |f_2|/f_3 < 0.5.$$

17. The optical lens for image pickup of claim 16, wherein $v_1$ is an Abbe number of the first lens element, $v_2$ is an Abbe number of the second lens element, and the following relation is satisfied:

$$28 < v_1 - v_2 < 40.$$

18. The optical lens for image pickup of claim 16, wherein $T_{23}$ is an axial distance between the second lens element and the third lens element, $T_{34}$ is an axial distance between the third lens element and the fourth lens element, and the following relation is satisfied:

$$0.5 < T_{23}/T_{34} < 1.5.$$

19. The optical lens for image pickup of claim 16, wherein $R_5$ is a curvature radius of the object-side surface of the third lens element, $R_6$ is a curvature radius of the image-side surface of the third lens element, and the following relation is satisfied:

$$|(R_5-R_6)/(R_5+R_6)| < 0.21.$$

20. The optical lens for image pickup of claim 16, wherein $R_3$ is the curvature radius of the object-side surface of the second lens element, $R_4$ is the curvature radius of the image-side surface of the second lens element, and the following relation is satisfied:

$$0.3 < (R_3-R_4)/(R_3+R_4) < 0.52.$$

21. The optical lens for image pickup of claim 16, wherein $CT_2$ is a central thickness of the second lens element, f is the focal length of the optical lens for image pickup, and the following relation is satisfied:

$$0.2 < (CT_2/f)*10 < 0.8.$$

* * * * *